(12) United States Patent
Sapir et al.

(10) Patent No.: US 8,756,138 B2
(45) Date of Patent: Jun. 17, 2014

(54) METHOD AND SYSTEM FOR REBALANCING INVESTMENT VEHICLES

(75) Inventors: Michael L. Sapir, Potomac, MD (US);
George O. Foster, Potomac, MD (US);
Howard S. Rubin, Potomac Falls, VA (US); Solomon G. Teller, Silver Spring, MD (US)

(73) Assignee: Proshare Advisors LLC, Bethesda, MA (US)

( * ) Notice: Subject to any disclaimer, the term of this patent is extended or adjusted under 35 U.S.C. 154(b) by 38 days.

(21) Appl. No.: 13/198,503

(22) Filed: Aug. 4, 2011

(65) Prior Publication Data

US 2012/0166326 A1 Jun. 28, 2012

Related U.S. Application Data

(60) Provisional application No. 61/370,984, filed on Aug. 5, 2010.

(51) Int. Cl.
*G06Q 40/06* (2012.01)
(52) U.S. Cl.
CPC ...................................... *G06Q 40/06* (2013.01)
USPC .......................................................... 705/36
(58) Field of Classification Search
USPC ..................................................... 705/35–45
See application file for complete search history.

(56) References Cited

U.S. PATENT DOCUMENTS

| | | | |
|---|---|---|---|
| 5,926,792 A | 7/1999 | Koppes et al. | |
| 7,571,134 B1 | 8/2009 | Burns et al. | |
| 7,831,497 B2 | 11/2010 | O'Neill | |
| 8,131,632 B2 * | 3/2012 | Friedman et al. | 705/37 |
| 2006/0100949 A1 | 5/2006 | Whaley et al. | |
| 2006/0184438 A1 | 8/2006 | McDow | |
| 2006/0253376 A1 | 11/2006 | Seale et al. | |
| 2008/0215499 A1 | 9/2008 | O'Neill | |
| 2009/0259597 A1 | 10/2009 | Wallman | |

OTHER PUBLICATIONS

O'Brien, Laurel, "Nuveen Launches First Municipal Closed-End Exchange-Traded Fund Index; Index to be Calculated and Published by the American Stock Exchange", Jul. 11, 2005, Business Wire.*
Raymong Wong, Rebalancing Act: A Primer on Leveraged and Inverse ETFs, Oct. 2009. www.nera.com/extimage/PUB_ETF_Leveraged_1009_web.pdf.*
Huang, C. et al., "Application of new a Priori Algorithm MDNC to Exchange Traded Fund," 2009 International Conference on Computational Science and Engineering, pp. 787-794.
Kuo, M. et al., "An ETF Trading Decision Support System by Using Neural Network and Technical Indicators," 2006 International Joint Conference on Neural Networks, Vancouver, BC, Canada, Jul. 16-21, 2006, pp. 2394-2401.

* cited by examiner

*Primary Examiner* — Richard C Weisberger
(74) *Attorney, Agent, or Firm* — Finnegan, Henderson, Farabow, Garrett & Dunner, LLP

(57) ABSTRACT

A computer-implemented method is provided for rebalancing an exchange-traded fund. The method is performed by a computer, and includes setting a daily target return for the exchange-traded fund based on a target base index. The method also includes monitoring an actual return of the exchange-traded fund over a time period. The method also includes setting a performance band for rebalancing the exchange-traded fund. The performance band is set based on the daily target return and a volatility of the target base index. The method further includes generating signals to rebalance the exchange-traded fund based on the performance band and the actual return.

53 Claims, 17 Drawing Sheets

ALL VALUES ARE MEDIANS FOR EACH DECILE.
SOURCE: BLOOMBURG®. BASED ON DAILY S&P 500® INDEX RETURNS FOR ALL POSSIBLE 30-DAY HOLDING PERIODS BETWEEN 12/31/1958 AND 12/31/2008. FOR ILLUSTRATIVE PURPOSES ONLY.

+2X STRATEGY

| MULTIPLE RANGES | HOLDING PERIODS (DAYS) | | |
|---|---|---|---|
| | 2 | 7 | 30 |
| 1.75 TO 2.25 | 99.2% | 96.3% | 90.0% |
| 1.50 TO 2.50 | 99.6% | 98.1% | 94.7% |
| 1.25 TO 2.75 | 99.8% | 98.7% | 96.5% |
| 1.00 TO 3.00 | 99.8% | 99.0% | 97.3% |
| 0.75 TO 3.25 | 99.9% | 99.2% | 97.8% |
| 0.50 TO 3.50 | 99.9% | 99.4% | 98.2% |
| 0.25 TO 3.75 | 99.9% | 99.5% | 98.5% |
| 0.00 TO 4.00 | 100.0% | 99.6% | 98.7% |
| < 0 | 0.0% | 0.2% | 0.7% |

-2X STRATEGY

| MULTIPLE RANGES | HOLDING PERIODS (DAYS) | | |
|---|---|---|---|
| | 2 | 7 | 30 |
| -1.75 TO -2.25 | 97.3% | 89.5% | 73.4% |
| -1.50 TO -2.50 | 98.7% | 94.6% | 85.3% |
| -1.25 TO -2.75 | 99.2% | 96.3% | 90.1% |
| -1.00 TO -3.00 | 99.4% | 97.1% | 92.3% |
| -0.75 TO -3.25 | 99.5% | 97.7% | 93.7% |
| -0.50 TO -3.50 | 99.6% | 98.1% | 94.7% |
| -0.25 TO -3.75 | 99.7% | 98.4% | 95.4% |
| 0.00 TO -4.00 | 99.9% | 99.1% | 97.3% |
| > 0 | 0.1% | 0.7% | 2.0% |

SOURCE: BLOOMBURG®, BASED ON DAILY S&P 500® INDEX RETURNS FOR ALL POSSIBLE HOLDING PERIODS BETWEEN 12/31/1958 AND 12/31/2008. FOR ILLUSTRATIVE PURPOSES ONLY.

*FIG. 2*

+2X STRATEGY

| MULTIPLE RANGES | HOLDING PERIODS (DAYS) | | |
|---|---|---|---|
| | 30 | 91 | 183 |
| 1.75 TO 2.25 | 90.0% | 82.6% | 80.0% |
| 1.50 TO 2.50 | 94.7% | 90.9% | 90.1% |
| 1.25 TO 2.75 | 96.5% | 93.9% | 93.5% |
| 1.00 TO 3.00 | 97.3% | 95.5% | 95.1% |
| 0.75 TO 3.25 | 97.8% | 96.3% | 96.1% |
| 0.50 TO 3.50 | 98.2% | 96.9% | 96.8% |
| 0.25 TO 3.75 | 98.5% | 97.3% | 97.3% |
| 0.00 TO 4.00 | 98.7% | 97.7% | 97.7% |
| < 0 | 0.7% | 1.1% | 1.2% |

-2X STRATEGY

| MULTIPLE RANGES | HOLDING PERIODS (DAYS) | | |
|---|---|---|---|
| | 30 | 91 | 183 |
| -1.75 TO -2.25 | 73.4% | 55.4% | 44.2% |
| -1.50 TO -2.50 | 85.3% | 74.9% | 70.2% |
| -1.25 TO -2.75 | 90.1% | 82.6% | 79.7% |
| -1.00 TO -3.00 | 92.3% | 86.6% | 84.5% |
| -0.75 TO -3.25 | 93.7% | 89.4% | 88.0% |
| -0.50 TO -3.50 | 94.7% | 91.0% | 90.1% |
| -0.25 TO -3.75 | 95.4% | 92.2% | 91.7% |
| 0.00 TO -4.00 | 97.3% | 95.2% | 95.5% |
| > 0 | 2.0% | 3.6% | 3.4% |

SOURCE: BLOOMBURG®, BASED ON DAILY S&P 500® INDEX RETURNS FOR ALL POSSIBLE HOLDING PERIODS BETWEEN 12/31/1958 AND 12/31/2008. FOR ILLUSTRATIVE PURPOSES ONLY.

*FIG. 3*

+2X STRATEGY

| MULTIPLE RANGES | HOLDING PERIODS (DAYS) | | |
|---|---|---|---|
| | 2 | 7 | 30 |
| 1.75 TO 2.25 | 97.8% | 91.4% | 81.1% |
| 1.50 TO 2.50 | 98.9% | 95.6% | 89.4% |
| 1.25 TO 2.75 | 99.3% | 97.0% | 92.9% |
| 1.00 TO 3.00 | 99.5% | 97.8% | 94.7% |
| 0.75 TO 3.25 | 99.6% | 98.3% | 95.7% |
| 0.50 TO 3.50 | 99.6% | 98.7% | 96.4% |
| 0.25 TO 3.75 | 99.7% | 98.8% | 96.9% |
| 0.00 TO 4.00 | 99.8% | 99.0% | 97.2% |
| < 0 | 0.1% | 0.6% | 1.4% |

-2X STRATEGY

| MULTIPLE RANGES | HOLDING PERIODS (DAYS) | | |
|---|---|---|---|
| | 2 | 7 | 30 |
| -1.75 TO -2.25 | 94.0% | 79.1% | 57.2% |
| -1.50 TO -2.50 | 96.8% | 88.4% | 74.1% |
| -1.25 TO -2.75 | 97.8% | 91.5% | 80.8% |
| -1.00 TO -3.00 | 98.3% | 93.4% | 84.8% |
| -0.75 TO -3.25 | 98.6% | 94.6% | 87.5% |
| -0.50 TO -3.50 | 98.9% | 95.6% | 89.4% |
| -0.25 TO -3.75 | 99.0% | 96.1% | 90.8% |
| 0.00 TO -4.00 | 99.3% | 97.9% | 94.1% |
| > 0 | 0.5% | 1.6% | 4.4% |

*FIG. 4*

SOURCE: BLOOMBURG®, BASED ON DAILY NASDAQ -100 INDEX® RETURNS FOR ALL POSSIBLE HOLDING PERIODS BETWEEN 2/05/1985 AND 2/31/2008. FOR ILLUSTRATIVE PURPOSES ONLY.

+2X STRATEGY

| MULTIPLE RANGES | HOLDING PERIODS (DAYS) | | |
|---|---|---|---|
| | 2 | 7 | 30 |
| 1.75 TO 2.25 | 98.4% | 92.6% | 83.1% |
| 1.50 TO 2.50 | 99.3% | 96.2% | 91.1% |
| 1.25 TO 2.75 | 99.5% | 97.2% | 93.8% |
| 1.00 TO 3.00 | 99.6% | 98.0% | 95.1% |
| 0.75 TO 3.25 | 99.7% | 98.5% | 96.1% |
| 0.50 TO 3.50 | 99.7% | 98.7% | 96.8% |
| 0.25 TO 3.75 | 99.8% | 99.1% | 97.2% |
| 0.00 TO 4.00 | 99.8% | 99.1% | 97.5% |
| < 0 | 0.1% | 0.4% | 1.2% |

-2X STRATEGY

| MULTIPLE RANGES | HOLDING PERIODS (DAYS) | | |
|---|---|---|---|
| | 2 | 7 | 30 |
| -1.75 TO -2.25 | 95.1% | 80.6% | 58.9% |
| -1.50 TO -2.50 | 97.6% | 89.6% | 75.5% |
| -1.25 TO -2.75 | 98.4% | 92.5% | 82.9% |
| -1.00 TO -3.00 | 99.0% | 94.6% | 86.9% |
| -0.75 TO -3.25 | 99.2% | 95.6% | 89.5% |
| -0.50 TO -3.50 | 99.3% | 96.2% | 91.0% |
| -0.25 TO -3.75 | 99.3% | 96.7% | 92.0% |
| 0.00 TO -4.00 | 99.8% | 98.1% | 95.1% |
| > 0 | 0.2% | 1.4% | 3.6% |

SOURCE: BLOOMBURG®, BASED ON DAILY DOW JONES U.S. OIL & GAS INDEX℠ RETURNS FOR ALL POSSIBLE HOLDING PERIODS BETWEEN 1/1/1992 AND 12/31/2008. FOR ILLUSTRATIVE PURPOSES ONLY.

*FIG. 5*

+2X STRATEGY

| MULTIPLE RANGES | HOLDING PERIODS (DAYS) | | |
|---|---|---|---|
| | 2 | 7 | 30 |
| 1.75 TO 2.25 | 98.3% | 94.2% | 84.5% |
| 1.50 TO 2.50 | 99.1% | 97.0% | 91.3% |
| 1.25 TO 2.75 | 99.5% | 98.2% | 93.9% |
| 1.00 TO 3.00 | 99.6% | 98.7% | 95.4% |
| 0.75 TO 3.25 | 99.7% | 99.1% | 96.2% |
| 0.50 TO 3.50 | 99.8% | 99.3% | 96.8% |
| 0.25 TO 3.75 | 99.9% | 99.4% | 97.2% |
| 0.00 TO 4.00 | 99.9% | 99.4% | 97.6% |
| < 0 | 0.0% | 0.3% | 1.1% |

-2X STRATEGY

| MULTIPLE RANGES | HOLDING PERIODS (DAYS) | | |
|---|---|---|---|
| | 2 | 7 | 30 |
| -1.75 TO -2.25 | 95.6% | 83.6% | 64.6% |
| -1.50 TO -2.50 | 97.8% | 91.1% | 78.2% |
| -1.25 TO -2.75 | 98.3% | 94.1% | 84.3% |
| -1.00 TO -3.00 | 98.8% | 95.4% | 87.2% |
| -0.75 TO -3.25 | 99.0% | 96.1% | 89.3% |
| -0.50 TO -3.50 | 99.1% | 97.0% | 91.1% |
| -0.25 TO -3.75 | 99.3% | 97.4% | 92.5% |
| 0.00 TO -4.00 | 99.7% | 98.6% | 94.8% |
| > 0 | 0.3% | 1.1% | 3.9% |

SOURCE: BLOOMBURG®, BASED ON DAILY DOW JONES U.S. FINANCIALS INDEX℠ RETURNS FOR ALL POSSIBLE HOLDING PERIODS BETWEEN 1/1/1992 AND 12/31/2008. FOR ILLUSTRATIVE PURPOSES ONLY.

*FIG. 6*

Note: Frequency of rebalancing -2x S&P 500® Daily Objective Strategy with 5% band between 12/31/1958 and 3/31/2009. Source: BLOOMBURG®. For illustrative purposes only.

Note: Cumulative Return on S&P 500® index, unrebalanced and rebalanced -2x Daily Objective Strategies (using 5% rebalanced trigger) for period from December 31, 2008, through June 30, 2009. Source: BLOOMBURG®. For illustrative purposes only.

METHOD AND SYSTEM FOR REBALANCING INVESTMENT VEHICLES

PRIORITY

This application claims the benefit of priority of U.S. Provisional Application No. 61/370,984, filed Aug. 5, 2010, entitled "METHOD AND SYSTEM FOR REBALANCING INVESTMENT VEHICLES," the entire contents of which is incorporated herein by reference in its entirety.

TECHNICAL FIELD

The present disclosure relates generally to investment vehicles and, more particularly, to methods and systems for rebalancing investment vehicles.

BACKGROUND

Investment vehicles include various forms, such as, for example, stocks, mutual funds, bonds, options, and exchange-traded funds (ETFs). It should be noted that although the present disclosure uses ETFs as exemplary investment vehicles in the below discussions, the scope of the present invention is not intended to be limited to ETFs. Rather, the methods and systems disclosed in the present invention are also applicable to other forms of investment vehicles, such as, for example, mutual funds, bonds, and options.

An ETF is an investment fund that can be traded, for example, on stock exchanges. An ETF may hold various assets, such as, for example, stocks, funds, bonds, index futures, swaps or short positions, along with cash equivalents. Such assets are hereafter generally referred to as "holdings" of an ETF. Most ETFs track a target base index, for example, the S&P 500® index. A leveraged and/or inverse ETF is designed to achieve a "leverage objective," that is, a positive or negative multiple of index return on a daily basis (e.g., +2× or −2× of index return). A fund manager may adjust fund holdings each day based on the closing value of fund assets, reflecting index returns and fund flows for that day in order to stay aligned with the +2× or −2× fund multiple goal.

Day-to-day consistency of index exposure, over time, is valuable to many investors. Although a leveraged and/or inverse ETF could be created with a longer-term objective, such as a monthly leverage objective, the ETF's index exposure would then vary within the month, as gains and losses in between monthly rebalancing change the ETF's market exposure. An ETF with a daily leverage objective, say, to be 200 percent exposed to an index, has the objective of providing that same leverage exposure at the end of each and every trading day, regardless of whether an investor bought, held, or sold the ETF position on a particular day. Adjusting holdings every day to match the fund multiple goal (e.g., +2× or −2× of index return) may reduce the risk of the ETF experiencing a total loss. The variation in leverage within the month for a monthly leverage objective could be sizable in higher-volatility environments and may lead to a significantly higher degree of leverage than the investor desires.

Leveraged and/or inverse index exposure in a liquid, transparent ETF can be utilized in a variety of ways, with both short- and longer-term horizons. Since the trading volume for leveraged and/or inverse ETFs, whether measured in dollars or shares, is large, it is likely that leveraged and/or inverse ETFs are commonly being utilized as short-term tactical trading tools. However, investors also regularly use leveraged and/or inverse ETFs as a key component of a longer-term portfolio strategy, for example, to pursue returns and manage the risk of long-term equity and fixed-income positions. The list below identifies a few of the most common applications of the leveraged and/or inverse ETFs all of which can be employed over time:

- Implement a tactical view (long or short term) of an index based on an outlook for the economy or segments of the market.
- Overweight or underweight an index exposure, such as a particular market-cap segment, sector, or country, by utilizing leverage and thereby avoiding the need to change other positions in the portfolio.
- Hedge or reduce risk, either as a short-term tactical hedge or for longer-term risk management.
- Execute an index-spread strategy designed to capture the relative returns of two indexes. For example, investors may wish to express a view that financial stocks are likely to outperform energy stocks, or that emerging market equities may outperform U.S. large-cap equities.
- Isolate the active risk component of an equity strategy (alpha) from active strategies. Alpha can be isolated by hedging the index or beta risk with a benchmark, e.g., a base level of performance of a certain index, for that strategy using an inverse or leveraged inverse index ETF.

In an upward-trending market, compounding can result in longer-term returns that are greater than the sum of the individual daily returns. In Table 1, the Index Daily Return column shows that an investment strategy that returns 10 percent per day for two consecutive days generates a 21 percent gain over the two-day period. This is greater than 20 percent, which is the sum of the individual-day returns. Similarly, in a downward-trending market, compounding can also result in longer-term returns that are less negative than the sum of the individual daily returns. An investment that declines 10 percent per day for two consecutive days would have a negative 19 percent return, not negative 20 percent. But in a volatile market scenario, compounding can result in longer-term returns that are less than the sum of the individual daily returns. An investment that rises 10 percent on one day and declines 10 percent the next would have a negative 1 percent return, which is less than the 0 percent sum of the individual-day returns.

Compounding in leveraged funds can result in gains or losses that occur much faster and to a greater degree, as shown in the +2× Fund Daily Return column of Table 1. In an upward-trending market, compounding can result in longer-term leveraged returns that are greater than two times the return of the unleveraged investment. A leveraged fund that grows 20 percent a day (2×10 percent index gain) for two consecutive days would have a 44 percent gain, not two times the 21 percent compound gain of the Index Daily Return.

In a downward-trending market, compounding results in +2× leveraged fund returns that are less negative than two times the return of the unleveraged investment. A +2× leveraged fund that declines 20 percent a day (2×10 percent index decline) for two consecutive days would have a negative 36 percent return. This is less negative than two times the 19 percent compound loss of the unleveraged investment.

TABLE 1

Compounding with Unleveraged and Leveraged Investments

| Day | Index Daily Return | +2x Fund Daily Return |
|---|---|---|
| UPWARD TREND | | |
| 1 | +10% | +20% |
| 2 | +10% | +20% |
| Compound 2-day Return | +21% [+1%] | +44% [+4%] |
| DOWNWARD TREND | | |
| 1 | −10% | −20% |
| 2 | −10% | −20% |
| Compound 2-day Return | −19% [−1%] | −36% [−4%] |
| VOLATILE MARKET | | |
| 1 | +10% | +20% |
| 2 | −10% | −20% |
| Compound 2-day Return | −1% [−1%] | −4% [−4%] |

In a volatile market, compounding can result in leveraged longer-term returns that are less than two times the return of the unleveraged investment. A +2x leveraged fund that rises 20 percent one day (2×10 percent index gain) and declines 20 percent the next (2×10 percent index decline) generates a negative 4 percent return. This is a greater loss than the two times negative 1 percent compound return of the unleveraged investment.

To better understand how the ETFs behave over time, the inventors analyzed strategies designed to provide +2x and −2x the daily performance of the S&P 500® Daily Objective Strategies over a 50-year time frame, and performed a similar analysis for the NASDAQ-100® and the Dow Jones$^{SM}$ financial and energy sector indexes for somewhat shorter time frames based on availability of historical data. In these analyses, fees, expenses, financing and transaction costs are ignored.

These studies compare the returns of +2x and −2xS&P 500® Daily Strategies with a period return (defined as +2x or −2x the period index return) for holding periods of 2, 7, 30, 91 and 183 calendar days. The sample contains all possible two-day, weekly, monthly, quarterly, and semi-annual holding periods within the past 50 years (1959 through 2008) for the S&P 500® Index. This large sample enables the inventors to compare all possible end-of-day entry and exit points, but it also leads to overlapping observations. The benefit of this approach is that it removes any potential bias of starting a holding period on a particular day of the week or month.
To focus on the compounding effect, some additional assumptions are used in this analysis:

For the +2x and −2x index returns, the leverage ratio is set at the beginning of each period and not changed for the duration of that period. For the +2x and −2xS&P 500® Daily Strategies, the leverage is reset daily to either +2x or −2x. Therefore, the return achieved by the leveraged and/or inverse Daily Objective Strategies is exactly the daily fund multiple times the daily index return each and every day of the holding periods.

Index price return is the basis for the analysis.

All return calculations exclude fees, financing, interest and expenses.

The +2x and −2x index period returns are not constrained by capital (i.e., losses can exceed negative 100%).

Table 2 contains statistics from the distribution of differences in return between the Daily Objective Strategy return and +2x and −2x the index return for all possible 2-, 7- and 30-day holding periods over the 50-year S&P 500® return history. The averages of the percentage return differences are all essentially zero, and the median is at or just below zero, indicating that leveraged and/or inverse strategies are about as likely to benefit as to be hurt by the compounding effect for periods up to 30 days for the S&P 500®.

The distribution of the return differences for the +2x and −2xS&P 500® Daily Strategies is tight and balanced over this long history. For example, half of the differences for the +2x Strategy for a 30-day holding period were between 0.1 percent and negative 0.1 percent. This means that for a +2x Strategy over a 30-day period where the S&P 500® return was 3 percent, the returns were in a range of 5.9 percent to 6.1 percent (compared with 2×3 percent, or 6 percent) approximately half the time. In addition, the percentage of positive differences was 53 percent for two-day holding periods. As we move out to longer periods, the return differences are positive about 40 percent of the time.

TABLE 2

S&P 500 ® +2x and −2x Daily Strategy vs. +2x and −2x Index Returns

| | +2x Differences | | | −2x Differences | | |
|---|---|---|---|---|---|---|
| Holding Periods | 2 days | 7 days | 30 days | 2 days | 7 days | 30 days |
| Average | 0.000% | 0.000% | −0.002% | 0.000% | −0.002% | −0.035% |
| 97.5$^{th}$ Percentile | 0.03% | 0.14% | 0.71% | 0.08% | 0.42% | 2.08% |
| 75$^{th}$ Percentile | 0.00% | 0.01% | 0.06% | 0.00% | 0.04% | 0.19% |
| Median | 0.00% | 0.00% | −0.03% | 0.00% | −0.01% | −0.09% |
| 25$^{th}$ Percentile | 0.00% | −0.02% | −0.10% | 0.00% | −0.05% | −0.29% |
| 2.5$^{th}$ Percentile | −0.02% | −0.12% | −0.50% | −0.07% | −0.35% | −1.54% |
| % of Periods Positive | 53% | 43% | 39% | 53% | 43% | 39% |

Source: BLOOMBERG ®, based on daily S&P 500 ® Index returns for all possible holding periods between Dec. 31, 1958 and Dec. 31, 2008. For illustrative purposes only.

As seen from the comparative results, the impact of compounding has historically been virtually neutral, with an average effect close to zero and medians close to zero or slightly negative. The overall potential for compounding to lead to positive versus negative effects is approximately equal. There is a high percentage of periods in which S&P 500® Daily Objective Strategies are close to a +2x or −2x leverage ratio over holding periods of a week and a month. The probabilities of getting close to a +2x or −2x realized multiple falls as the holding period lengthens. Leveraged and/or inverse Daily Objective Strategy returns for 7- and 30-day holding periods were, at times, the opposite sign to the period target (a "flipped" return), but this was infrequent.

The largest driver of compounding effects is the level of volatility in the market over the investor's holding period. This point is frequently mentioned in academic, analyst, and media articles when discussing the performance differences for leveraged and/or inverse funds held over time. The long-term study using +2×S&P 500® Daily Strategy returns carried out by the inventors supports the view that volatility is the key factor driving the size of the differences. To explore the connection between volatility and variability of returns over the 50-year S&P 500® return history, inventors first sort the return differences between the 30-day +2×S&P 500® Daily Strategy and the S&P 500® return times two. Inventors then place these return differences into 10 deciles, or "buckets," ranking them from the most positive to the most negative. For each of these deciles, inventors calculate the median return difference and the median annualized 30-day S&P 500® volatility.

FIG. 1 displays levels of volatility of returns over the 50-year S&P 500® return history and the magnitude of the return difference between the 30-day +2×S&P 500® Daily Strategy and the S&P 500® return times two. As shown in FIG. 1, the holding periods with the most positive and negative deciles of return differences were also ones that have higher volatility. The U-shape of the median volatilities across the return difference deciles reveals that the smallest return differences tend to occur when volatility is lowest. It is notable that the 2008 episode of extreme volatility was the main factor in observing wider return spreads for longer holding periods for the leveraged and/or inverse Daily Objective Strategies.

As shown in FIG. 1, the degree of impact that volatility has on leveraged Daily Objective Strategy returns is relative to the magnitude of the index return for the period. In periods when index return magnitudes are very large, the return differences tend to be large but positive. In contrast, the periods of the most negative differences (0-10th decile) are those where there have been high S&P 500® volatility levels accompanied by index returns close to zero (that is, flat or trendless markets).

In Table 3, data from the inventors' study of +2×Daily Strategy fund returns show the medians for each decile of return differences, along with the median volatility and absolute value of index return for each bucket. Table 3 shows that volatility is not always unwelcome to investors pursuing returns, as higher-magnitude index returns (both positive and negative) are somewhat correlated with higher-volatility market environments.

TABLE 3

+2x S&P 500 ® Daily Strategy vs. +2 Times 30-Day Period Index Return

| Return Difference Decile | Return Differences* | Absolute Value of S&P 500 ® Return* | Index Volatility* |
|---|---|---|---|
| 90$^{th}$ to 100$^{th}$ | 0.47% | 6.46% | 14.80% |
| 80$^{th}$ to 90$^{th}$ | 0.17% | 4.63% | 11.40% |
| 70$^{th}$ to 80$^{th}$ | 0.07% | 3.31% | 9.97% |
| 60$^{th}$ to 70$^{th}$ | 0.02% | 2.19% | 9.37% |
| 50$^{th}$ to 60$^{th}$ | −0.02% | 0.86% | 8.95% |
| 40$^{th}$ to 50$^{th}$ | −0.04% | 0.32% | 9.47% |
| 30$^{th}$ to 40$^{th}$ | −0.06% | 0.23% | 11.08% |
| 20$^{th}$ to 30$^{th}$ | −0.10% | 0.20% | 12.41% |
| 10$^{th}$ to 20$^{th}$ | −0.15% | 0.09% | 14.71% |
| 0 to 10$^{th}$ | −0.32% | 0.14% | 20.43% |

*All values are medians for each decile. Source: BLOOMBERG ®, based on daily S&P 500 ® Index returns for all possible 30-day holding periods between Dec. 31, 1958 and Dec. 31, 2008. For illustrative purposes only.

FIG. 2 shows the percentage or frequency of realized multiples within selected ranges around +2× and −2×S&P 500® Daily Strategies for every holding period of 2, 7 and 30 days over the 50 years from 1959 to 2008. As shown in FIG. 2, over relatively short holding periods, there has been a high frequency with which +2× and −2×S&P 500® Daily Strategies were closer to their index return times the fund multiple. Observations of long return histories for more volatile indexes show that the frequencies are lower than that for the S&P 500®, but still generally high. The longer the holding period and the more volatile the underlying benchmark, the greater the likelihood that the impact of compounding will cause the returns of a leveraged or inverse Daily Objective Strategies to deviate from the fund multiple.

For leveraged and/or inverse Daily Strategies that track indexes with volatility profiles similar to or lower than the S&P 500®, the analysis indicates that these Daily Strategies have produced realized multiples reasonably close to the +2× or −2× the index return without any rebalancing. For a +2×S&P 500® Daily Strategy, as many as 95 percent of the realized multiples fell within a range of +1.5 to +2.5 (compared with a +2× the index return) over all possible 30-day holding periods. Even higher percentages result for 2- and 7-day horizons. For a −2×S&P 500® Daily Strategy, somewhat fewer (85 percent) realized multiples fell within a negative 1.5 to negative 2.5 multiple range for a 30-day holding period. The frequency of negative multiples for a +2×S&P 500® Daily Strategy and of positive multiples for a −2×S&P 500® Daily Strategy also exists. These multiples are referred to as "flipped." Flipped multiples happened rarely: less than 1 percent of the 30-day holding periods for a +2×S&P 500® Daily Strategy and about 2 percent for a −2×S&P 500® Daily Strategy.

FIG. 3 shows the realized multiples for longer-term holding periods, including monthly, quarterly and six-month holding periods for +2× and −2×S&P 500® Daily Strategies. For a −2× Strategy, the frequency at which realized multiples fall within a negative 1.5 to negative 2.5 range falls from 85 percent for 30 days to 75 percent for a quarter, and to 70 percent for six months, assuming no rebalancing. The frequency with which returns flip (realized multiples are greater than 0) for the −2×S&P 500® Daily Strategy for a 6-month versus a 30-day holding period rises from 2 percent to 3.4 percent. FIGS. 2 and 3 show a clear connection between the length of the holding period and the probability of achieving a multiple close to the +2× or −2× the index return.

As of mid-2009, more than half of leveraged and/or inverse fund assets in the U.S. were invested in ETFs based on the broad-based equity or fixed-income categories. However, many investors also use leveraged and/or inverse funds tracking U.S. sector indexes with higher return volatility. To evaluate the realized multiples for Daily Objective Strategies with greater historical risk-reward profiles, the inventors calculate realized multiples over a long-term history for 2-, 7- and 30-day holding periods for Daily Objective Strategies with multiples of +2× and −2× for three other indexes: the NASDAQ-100 Index®, the Dow Jones U.S. Financials Index$^{SM}$ and the Dow Jones U.S. Oil & Gas Index$^{SM}$. FIG. 4 shows realized multiples for +2× and −2× Daily Objective Strategies based on the NASDAQ-100 Index®. FIG. 5 shows realized multiples for +2× and −2× Daily Objective Strategies based on the Dow Jones U.S. Oil & Gas Index$^{SM}$. FIG. 6 shows realized multiples for +2× and −2× Daily Objective Strategies based on the Dow Jones U.S. Financials Index$^{SM}$. These returns do not illustrate the performance of an actual investment.

The history of daily NASDAQ-100 Index® returns begins in 1985, with the index having a return volatility of 28.6 percent over the 1985 to 2008 period. This is significantly higher than the return volatility of 18.3 percent for the S&P 500® over the same period. Comparing FIGS. 2 and 4 reveals that the frequencies of realized multiples for a +2× and −2×

NASDAQ-100® Daily Strategy held for 30 days across all multiple ranges are somewhat lower than the S&P 500® due to the higher volatility of the index, but still above 80% (the only exception is the negative 1.75 to negative 2.25 range for the −2× Strategies). For example, as shown in FIG. 4, for a −2× NASDAQ-100® Daily Strategy held 30 days, the negative 1.50 to negative 2.50 realized multiple range frequency was 74.1 percent, compared with 85.3 percent for the S&P 500® leveraged strategy, as shown in FIG. 2.

The Dow Jones U.S. Financials Index$^{SM}$ and Dow Jones U.S. Oil & Gas Index$^{SM}$ data are available back to 1992, thus providing 17 years of return experience. The annualized return volatilities based on daily data for each index were 24.85 percent and 24.80 percent, respectively; a bit lower than that of the NASDAQ-100 Index®, but higher than the S&P 500®. Comparing FIGS. 4-6 reveals that the realized multiples for these Daily Objective Strategies are also a bit higher than for the NASDAQ-100 Index®, which is due to the slightly lower return volatilities of the underlying indexes. Therefore, the analysis of higher-volatility indexes further supports the connection between volatility and holding-period risk for holders of leveraged and/or inverse funds with daily fund multiples.

To summarize these findings, there is a high probability that the realized multiples of the Daily Objective Strategies will be close to the fund multiple over time. The shorter the period and the lower the index volatility, the higher the probability. For longer time periods and more volatile benchmarks, the inventors observed lower probabilities. With regard to ETFs, the primary concern of the investors is the performance of leveraged and/or inverse ETFs over time, particularly in a volatile environment. Accordingly, it may be desirable to have methods or systems involving ETFs that may improve the performance of the ETFs over time.

SUMMARY

In one exemplary embodiment, the present disclosure is directed to a computer-implemented method for rebalancing an exchange-traded fund. The method is performed by a computer, and includes setting a daily target return for the exchange-traded fund based on a target base index. The method also includes monitoring an actual return of the exchange-traded fund over a time period. The method also includes setting a performance band for rebalancing the exchange-traded fund. The performance band is set based on the daily target return and a volatility of the target base index. The method further includes generating signals to rebalance the exchange-traded fund based on the performance band and the actual return.

In another exemplary embodiment, the present disclosure is directed to a computer-readable medium tangibly embodied in a storage device containing instructions which, when executed on a processor, perform a method of rebalancing an exchange-traded fund. The method includes setting a daily target return for the exchange-traded fund based on a target base index. The method also includes monitoring an actual return of the exchange-traded fund over a time period. The method also includes setting a performance band for rebalancing the exchange-traded fund. The performance band is set based on the daily target return and a volatility of the target base index. The method further includes generating signals to rebalance the exchange-traded fund based on the performance band and the actual return.

In yet another exemplary embodiment, the present disclosure is directed to a system for rebalancing an exchange-traded fund. The system includes a server configured to set a daily target return for the exchange-traded fund based on a target base index. The server is also configured to generate signals to perform a rebalance on the exchange-traded fund based on a performance band and an actual return of the exchange-traded fund. The performance band is set based on the daily target return and a volatility of the target base index. The system also includes a user interface configured to receive an input from a user, display to the user the actual return of the exchange-traded fund over a time period, and customize the performance band for performing the rebalance, based on the input from the user.

BRIEF DESCRIPTION OF THE DRAWINGS

FIG. 2 illustrates percentage or frequency of realized multiples within selected ranges around +2× and −2×S&P 500® Daily Strategies for every holding period of 2, 7, and 30 days over the 50 years from 1959 to 2008;

FIG. 3 illustrates realized multiples for longer-term holding periods, including monthly, quarterly and six-month holding periods for +2× and −2×S&P 500® Daily Strategies;

FIG. 4 illustrates realized multiples for +2× and −2× Daily Objective Strategies based on the NASDAQ-100 Index®;

FIG. 5 illustrates realized multiples for +2× and −2× Daily Objective Strategies based on the Dow Jones U.S. Oil & Gas Index$^{SM}$;

FIG. 6 illustrates realized multiples for +2× and −2× Daily Objective Strategies based on the Dow Jones U.S. Financials Index$^{SM}$;

DETAILED DESCRIPTION

Figure 1:
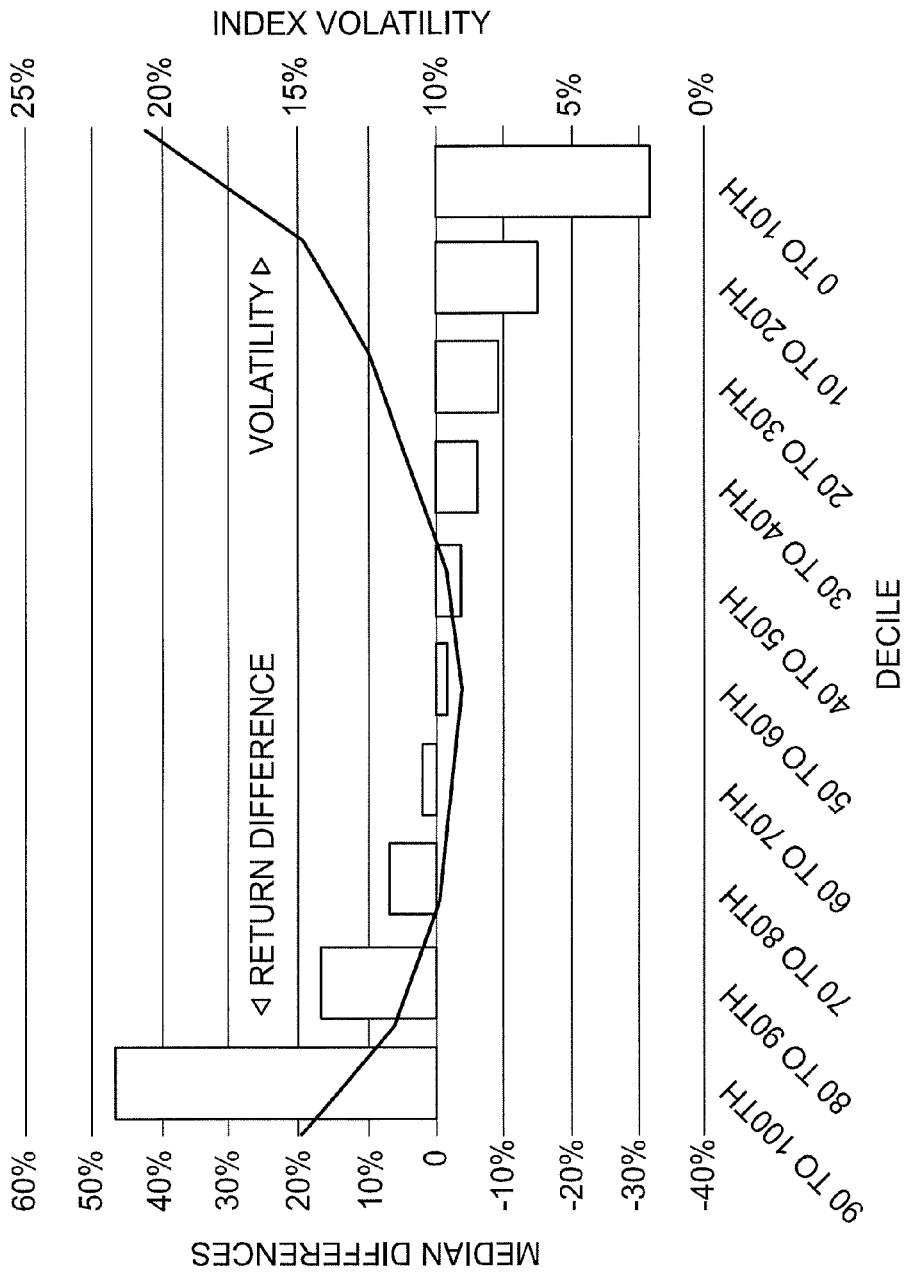
FIG. 1 illustrates levels of volatility of returns over the 50-year S&P 500® return history and the magnitude of the return difference between the 30-day +2×S&P 500® Daily Strategy and the S&P 500® return times two.
Figure 7:
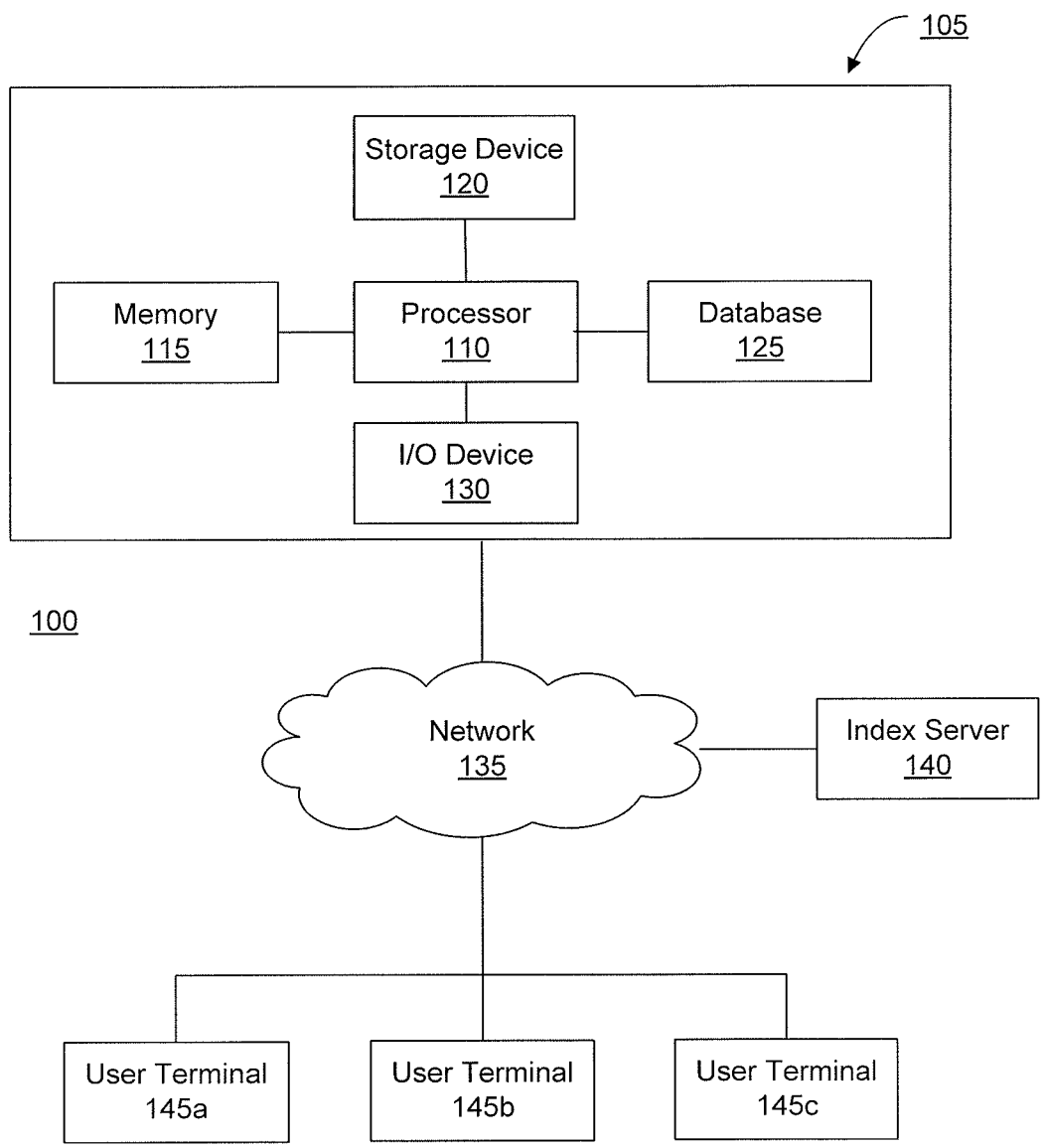
FIG. 7 illustrates an exemplary system consistent with the disclosed embodiments.

FIG. 7 illustrates an exemplary system 100 consistent with the disclosed embodiments. System 100 may be a financial system, which may provide financial products, such as, leveraged and/or inverse exchange-traded funds (ETFs), stocks, mutual funds, bonds. System 100 may include a server 105 configured to provide financial products to one or more customers (also referred to as "users" of the system 100), such as investors and fund managers. The term "server" may represent any computing device, including, but not limited to, laptop computer, desktop computer, workstation computer, and server computer. Server 105 may include at least one processor 110 configured to perform data processing, such as, a Central Processing Unit (CPU). Server 105 may also include at least one memory 115. Memory 115 may be configured to store data, such as system configuration data, program coding data for implementing the disclosed methods, and data temporarily stored for subsequent use by processor 110. Memory 115 may include any suitable type of memory. For example, memory 115 may include a read-only memory (ROM), a random-access memory (RAM), and/or a flash memory.

Server 105 may also include a storage device 120 configured to store data. Storage device 120 may include any suitable type of storage device, including, for example, a magnetic storage device, such as a tape, a hard disk, a compact disc (CD), a digital video disc (DVD), or a Blu-ray disc. Server 105 may also include a database 125. Database 125 may be configured to store data in an organized manner. Server 105 may also include an input/output (I/O) device 130. Input/output device 130 may include any suitable input/output device known in the art, for example, a keyboard, a mouse, a touch pad, and/or a data input/output port. One of ordinary skill in the art can appreciate that server 105 may include a greater or lesser number of components.

Server 105 may be connected with one or more user terminals, designated in FIG. 7 as 145a, 145b, and 145c, through a network 135. Each of the user terminals 145a, 145b, and 145c may include a computer, such as a laptop computer, a desktop computer, and/or a displaying device, such as a monitor. A user interface may be displayed at the user terminals 145a, 145b, and 145c and may be accessed by the customers at the user terminals. Customers may access server 105, through the user interface, to retrieve information regarding the financial products provided on server 105, and may manage the financial products, such as a leveraged and/or inverse ETF, at the user terminals 145a, 145b, and 145c.

Server 105 may also be connected with an index server 140 through network 135. Index server 140 may be any suitable type of server, and may store information, such as, returns or values related to a target base index, for example, the S&P 500® index. Server 105 may retrieve information regarding the target base index from index server 140. The information regarding the target base index may be used at server 105 to determine a rebalance strategy for a leveraged and/or inverse ETF.

Figure 8:
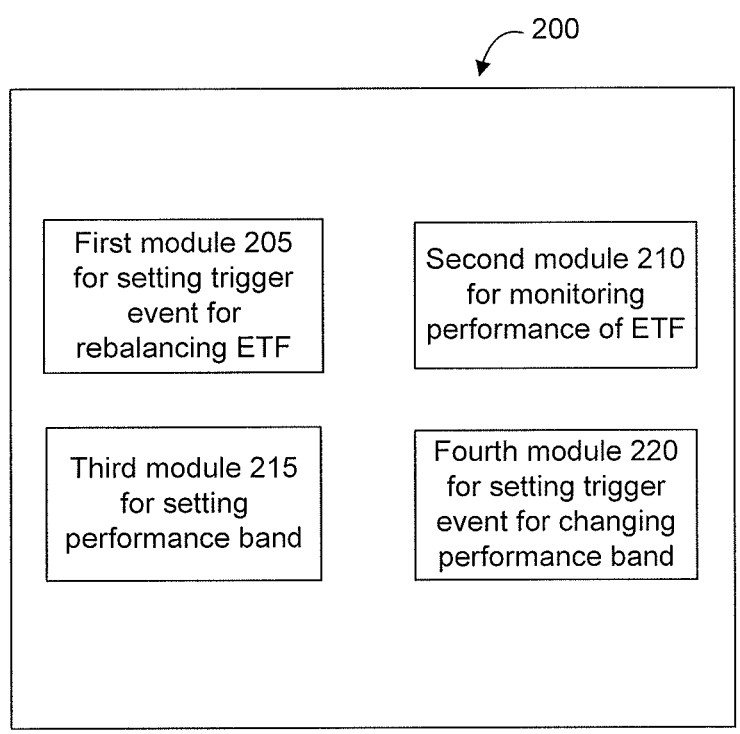
FIG. 8 illustrates an exemplary user interface consistent with the disclosed embodiments.

FIG. 8 schematically illustrates an exemplary user interface 200 consistent with the disclosed embodiments. User interface 200 may be implemented at each of user terminals 145a, 145b, and 145c, and may include hardware and/or software components. In some embodiments, user interface 200 may include hardware devices and/or software programs, and may be configured to generate displays on a displaying device at user terminals 145a, 145b, and 145c. User interface 200 may receive user inputs via input devices at user terminals 145a, 145b, and 145c. In some embodiments, user interface 200 may be implemented as a program and may be installed at user terminals 145a, 145b, and 145c. In some embodiments, user interface 200 may be a program installed at server 105, may be implemented as a webpage which may be stored at server 105 or at a third-party server, or may be implemented using cloud computing techniques or other appropriate techniques. Users at terminals 145a, 145b, and 145c may access the remotely-stored user interface through network 135.

As schematically shown in FIG. 8, user interface 200 may include a first module 205 for setting a trigger event for rebalancing a leveraged and/or inverse ETF. In one embodiment, the trigger event may be calendar based. For example, the trigger event may include a regular rebalance time interval period, such as, for example, a week, a month, six months, or a year. The trigger event may also include a rebalance frequency, such as, for example, once a week, once a month, or 10 times a year.

System 100 may generate signals, such as buy and/or sell orders, to perform a rebalance of the leveraged and/or inverse ETF when the rebalance time interval period has passed or according to the rebalance frequency. System 100 may generate the signals to rebalance the ETF via server 105. Server 105 may generate the signals to rebalance the ETF automatically, or in response to user inputs received at the user terminals 145a, 145b, and 145c. The signals generated by server 105 may include recommendations for rebalancing the ETF for the users (e.g., brokers, investors) at the user terminals 145a, 145b, and 145c.

In another embodiment, the user, at the user terminal 145a, 145b, or 145c, may customize the rebalance time interval period and/or rebalance frequency through user interface 200. For example, the user may select a rebalance time interval period and/or rebalance frequency from a list of available rebalance time interval periods and/or rebalance frequencies provided by server 105, or may customize the rebalance time interval period and/or rebalance frequency by manual input. First module 205 or a separate module may provide rebalancing tools for users to specify rebalancing strategies, such as buying ETF holdings, selling ETF holdings, and shorting an ETF.

In another embodiment, the trigger event may be based on a fixed or dynamic percentage. For example, rebalancing may be triggered when the variance between the index and ETF returns reaches a certain level, such as, for example, 5%, 10%, 15%. This trigger percentage may be fixed. For example, system 100 may automatically specify a fixed trigger percentage, or the user may specify the fixed trigger percentage. The trigger percentage may also be dynamic. For example, system 100 may change the trigger percentage automatically at any time or system 100 may allow the user to customize the trigger percentage at any time. In one embodiment, system 100 may change, or may allow the user to change the trigger percentage depending on the volatility of the market. Under a relatively more volatile market condition, system 100 or the user may increase or decrease the trigger percentage with a larger adjustment, whereas under a relatively less volatile market condition, system 100 or the user may decrease the trigger percentage with a smaller adjustment.

Percentage-return triggers are commonly used for asset-mix rebalancing. Percentage triggers have the advantage of being more adaptive to market conditions, leading to more frequent rebalancing in high-volatility periods and less in more trending markets. This approach is designed to be consistent with the compounding effects on leveraged and inverse funds that the rebalancing process is seeking to reduce. For percentage-trigger rebalancing, time intervals between trades vary depending on the leverage multiple and prevailing market conditions (that is, volatility of returns) of the index on which the fund is based.

Referring to FIG. 8, in some embodiments, server 105 and/or the user may determine or specify a trigger event, such as a rebalance time interval period, a rebalance frequency, and a trigger percentage, based on an analysis of the performance of the leveraged and/or inverse ETF, a prediction of the future performance of the leveraged and/or inverse ETF, and/or the volatility of the target base index. In some embodiments, the trigger event may be dynamically determined based on the volatility or implied volatility of underlying target base index, or a function of the volatility (or implied volatility). An implied volatility may be an estimated volatility of the securities or other financial vehicles included in the target base index, or may be any other suitable form of implied volatilities known in the art. Server 105 may provide the rebalance time interval period and/or rebalance frequency at the first module 205 for the user to select. When rebalance of the leveraged and/or inverse ETF is automatically performed by system 100 based on a rebalance interval period and/or a frequency, system 100 may automatically determine a rebalance strategy.

The rebalance strategy may include selling holdings of the leveraged and/or inverse ETF, such as, funds, stocks, and/or bonds. The rebalance strategy may also include buying additional holdings, such as funds, stocks, and/or bonds, into the leveraged and/or inverse ETF. The rebalance strategy may also include holding the ETF without rebalancing for a certain period under certain conditions, for example, when the volatility is high. The rebalance strategy may also include holding a pair of a leveraged ETF and an inverse ETF for a short time relative to the volatility of the underlying target base index. The rebalance strategy may also include, based on the volatility, investing in a leveraged ETF in a rising, low-volatility market (e.g., investing in the leveraged ETF when the volatility of the target base index is lower than a certain threshold volatility), or shorting an inverse ETF in a rising, high-volatility market (e.g., shorting the ETF when the volatility of the target base index is higher than a certain threshold volatility), and/or implementing a strategy using a pair of leveraged and inverse ETFs. For example, when implementing a strategy using a pair of leveraged and inverse ETFs, the rebalance strategy may include investing in both a leveraged and an inverse ETF in a trending, low-volatility market (e.g., when the volatility of the target base index is lower than a certain threshold volatility), and/or shorting both a leveraged and an inverse ETF in a range-bound, high-volatility market (e.g., when the volatility of the target base index is higher than a certain threshold volatility).

The trigger event for rebalancing the leveraged and/or inverse ETF may specify a "performance band," that is, a quantitative range having an upper limit and a lower limit, representing an allowable range for the difference between the return of the leveraged and/or inverse ETF and the return of the target base index. The performance band for triggering a rebalance may be dynamically determined or set by server 105 and/or the users, based on one or more factors including the daily target return of the ETF, the performance of the ETF, the returns of the target base index, and the volatility (or implied volatility) of the target base index, or may be predetermined (e.g., fixed). System 100 may compare, for example, by server 105, an actual return of the ETF and a return of the target base index and determine a difference between these two returns. The difference may be compared with the performance band to determine whether the difference falls within or outside of the performance band. If the difference falls within the performance band, a rebalance may not be triggered. If the difference falls outside of the performance band, a rebalance of the leveraged and/or inverse ETF may be triggered. Based on the comparison between the difference and the performance band, system 100 may generate, e.g., via server 105, signals such as buy and/or sell orders, to rebalance the ETF. Depending on rebalance strategies, server 105 may generate signals to rebalance the ETF automatically, or in response to users' input received at the user terminals 145a, 145b, and 145c.

User interface 200 may include a second module 210 for monitoring the performance of the leveraged and/or inverse ETF. For example, a user may monitor the current value, price, and/or return (e.g., gain and loss) of the leveraged and/or inverse ETF through the second module 210. Second module 210 may display this information regarding the leveraged and/or inverse ETF in real-time on the displaying device at the user terminals 145a, 145b, or 145c. Second module 210 may also monitor the performance of the target base index, such as the value of the S&P 500® index.

User interface 200 may include a third module 215 for setting the performance band. If the difference in returns falls outside of the allowable performance band, system 100 may generate signals (such as buy and/or sell orders), e.g., via server 105, to rebalance the leveraged and/or inverse ETF. For example, assuming the performance band is [negative 10%, positive 10%], then once the difference between the return of the leveraged and/or inverse ETF and the return of the target base index is more than 10% in either the positive or negative direction, a rebalance may be triggered. The upper limit and the lower limit of the performance band may have the same magnitudes, e.g., as in [negative 10%, positive 10%], or different magnitudes, e.g., as in [negative 10%, positive 15%].

The trigger event for triggering a rebalance may include different trigger events for buying and selling ETF holdings. For example, the performance band may include an upper limit of 15% for buying (or selling) ETF holdings (e.g., stocks, funds, options), and −10% for selling (or buying) ETF holdings. When the difference between the return of the leveraged and/or inverse ETF and the return of the target base index exceeds 15%, a rebalance event including, e.g., buying more ETF holdings, may be triggered. When the difference between the return of the leveraged and/or inverse ETF and the return of the target base index is less than −10%, a rebalance event including, e.g., selling more ETF holdings, may be triggered. In some embodiments, the trigger for buying may include no trigger or may require negative consent for rebalance. The upper and lower limits (e.g., 15% and −10%) may be predetermined (e.g., fixed) or may be dynamically set by system 100 or by the user using user interface 200.

User interface 200 may include a fourth module 220 for setting a trigger event for changing the performance band. The trigger event (a second trigger event) for changing the performance band may be different from the trigger event (a first trigger event) for rebalancing the leveraged and/or inverse ETF. The trigger event for changing the performance band may be flexible, and may be any event specified by the user. For example, the user may desire to change the performance band based on the overall performance of the leveraged and/or inverse ETF, a predetermined time interval, such as a year, a volatility (or an implied volatility) of the target base index, or a prediction of the future performance of the leveraged and/or inverse ETF. Alternatively and/or additionally, the fourth module 220 may automatically change the performance band based on a preprogrammed strategy. Changing the performance band includes enlarging or narrowing the band, in one direction (positive or negative) or both directions (both positive and negative). For example, based on factors such as the performance of the ETF and the volatility (or implied volatility) of the target base index, the performance band's upper limit may be dynamically varied within a predetermined range, for example, from 5% to 20%, and the lower limit may be dynamically varied within a predetermined range, for example, from −15% to −5%. The upper and lower limits may be dynamically varied independent of one another or in a predetermined relation (e.g., both being increased or decreased by the same percentage).

Figure 9:
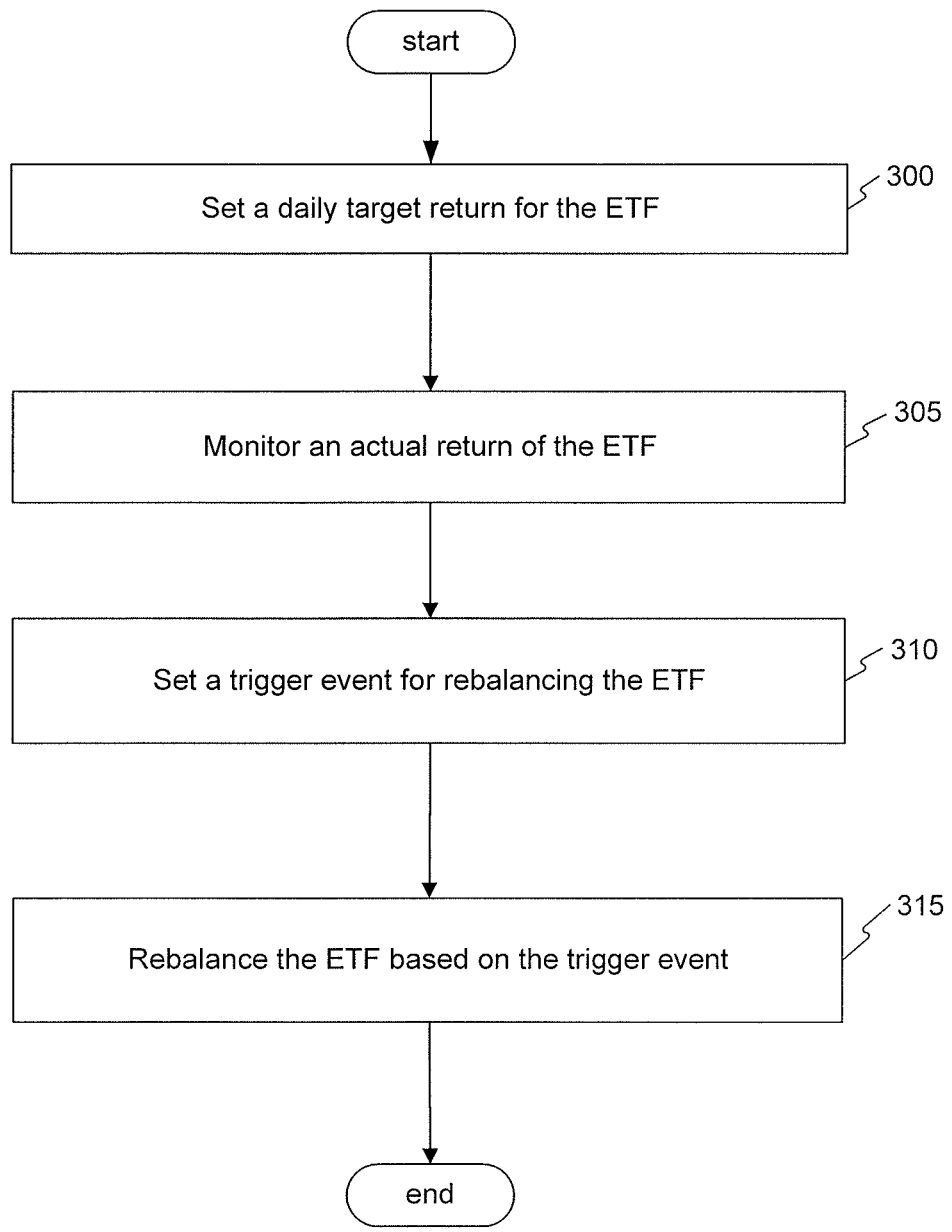
FIG. 9 illustrates an exemplary process for rebalancing a leveraged and/or inverse ETF consistent with the disclosed embodiments.

FIG. 9 schematically illustrates an exemplary process for rebalance a leveraged and/or inverse ETF. System 100 may set a daily target return for the leveraged and/or inverse ETF (Step 300). The daily target return may be, for example, ±1×, ±1.5×, ±2×, ±2.5×, or any suitable target multiple of the return of the target base index, such as the S&P 500® index. For example, when the return of the S&P 500® index is ±10%, the daily target return of the leveraged and/or inverse ETF may be ±20%. The daily target return may or may not include the service fees charged by a ETF broker. System 100 may monitor the actual return of the leveraged and/or inverse ETF (Step 305), for example, through the second module 210. The actual return of the leveraged and/or inverse ETF may include the actual return of the leveraged and/or inverse ETF in real-time within a trading period, at the end of a trading period, or at the end of any predetermined time interval, such as, a week, a month, 40 days, or a year.

System 100 may set a trigger event for rebalancing the leveraged and/or inverse ETF (Step 310). For example, server 105 may set the trigger event. In another embodiment, the user at the user terminal 145a, 145b, or 145c may customize the trigger event for rebalancing the leveraged and/or inverse ETF. The trigger event may be set based on at least one of the actual return of the leveraged and/or inverse ETF, the daily target return, the return of the target base index, and the volatility of the target base index. The trigger event may also be set based on a rebalance time interval period, and/or a rebalance frequency.

System 100 may generate signals (such as buy and/or sell orders), e.g., via server 105, to rebalance the leveraged and/or inverse ETF based on the occurrence of the trigger event (Step 315). For investors whose goal is to increase the likelihood of getting close to the index return times the fund multiple over time, e.g., +2× or −2× of the index return, rebalancing may be an effective strategy to reduce the difference between the actual return of the leveraged and/or inverse ETF and the fund multiple of the index return.

The impact of rebalancing on the returns of leveraged and/or inverse ETF strategies is directly related to the effect of compounding. While rebalancing may be helpful if investors seek to match their long-term returns to the fund multiple over time, the returns from such a rebalancing strategy can theoretically be lower than those of an unrebalanced strategy in a trending market or low-volatility market environment. Rebalancing has the effect of removing both the negative and potentially positive effects of compounding.

Figure 10:
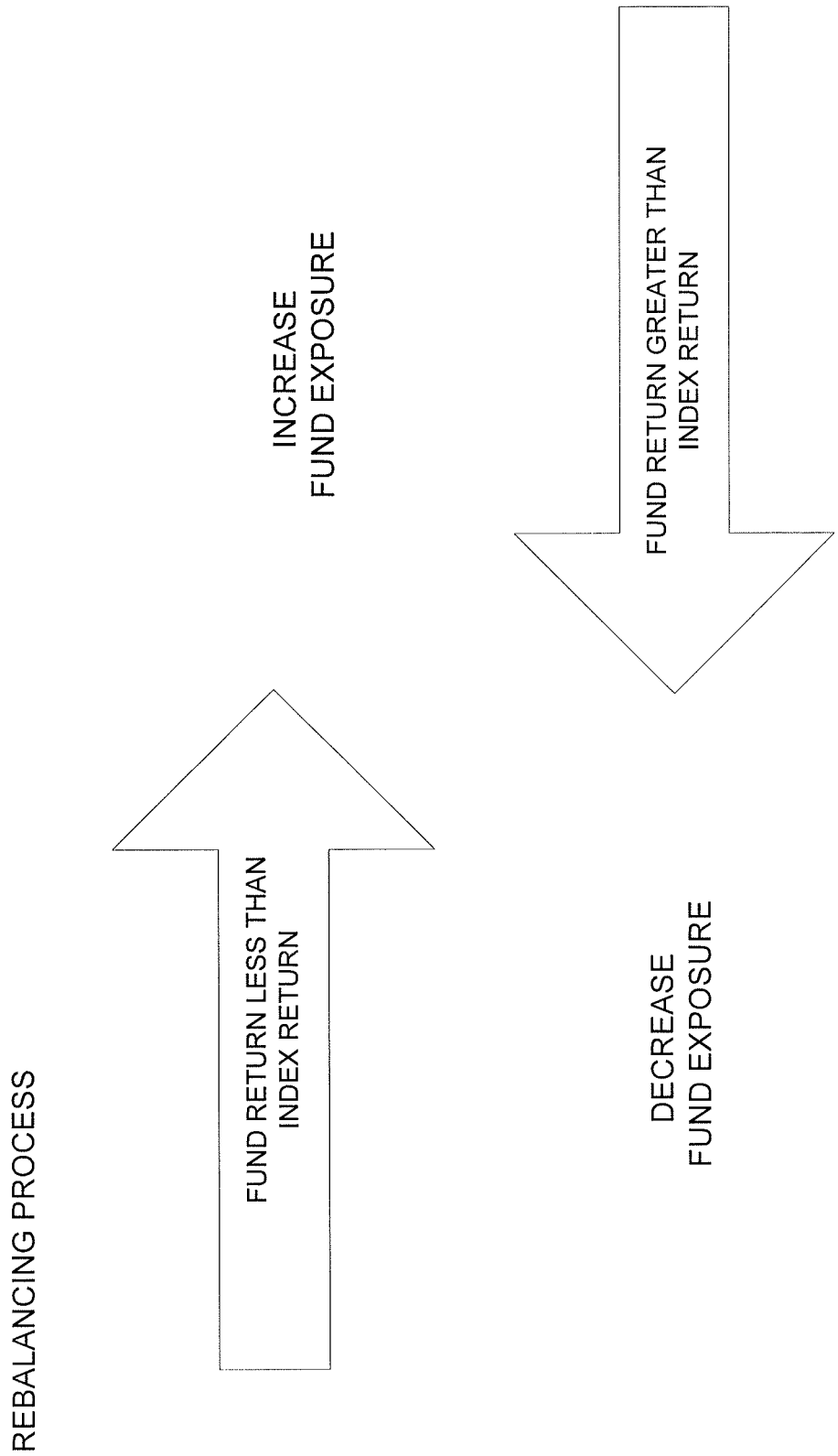
FIG. 10 schematically illustrates a rebalancing process.

The rebalancing process for leveraged and/or inverse ETF positions involves carefully monitoring the difference between the index return and ETF return, and rebalancing holdings of the leveraged and/or inverse ETF, either when the difference moves beyond a specified percentage trigger (e.g., outside of the performance band), or at a fixed rebalance interval period. FIG. 10 schematically shows a rebalancing process, where fund exposure is increased if the leveraged and/or inverse ETF return is less than the index return, and decreased if the leveraged and/or inverse ETF return is greater than the index return. The size or amount of the rebalance trade for any period may be calculated as: Rebalance Amount=Starting Fund Value×(Index Return−Fund Return).

Table 4 demonstrates an exemplary case of large daily index returns and rebalancing trades that could be implemented by an investor who wishes to increase the likelihood of keeping positions close to the fund multiple over time. Since inverse ETFs are designed to move in the opposite direction of their underlying indexes, they typically will require a greater frequency and/or degree of rebalancing. An investor applying the same rebalancing trigger percentage to low- and high-volatility index ETFs with leverage is likely to find that larger-size rebalancing trades may be required, as the potential for larger performance differences and less proximate realized multiples is otherwise increased. Alternatively, an investor can set an appropriate trigger event for rebalancing by taking into account the volatility of the target base index and a target rebalance frequency. For example, to rebalance weekly, the investor could base a trigger event on the weekly volatility of the target base index for the leveraged and/or inverse ETF. Compared with returns from an unrebalanced leveraged and/or inverse ETF, rebalancing leveraged and/or inverse ETF positions reduces the differences between the investor's realized return from the leveraged and/or inverse ETF positions over multi-day periods and the fund multiple times the target base index returns.

TABLE 4

Daily Objective Strategy Rebalancing Example Assume Desires $200 of Long or Inverse Index Exposure

|  | Index | +2x Strategy | −2x Strategy |
| --- | --- | --- | --- |
| Starting Value | $100 | $100 | $100 |
| One-day Return | +10% | +20% | −20% |
| Ending Value | $110 | $120 | $80 |
| Rebalance Trade | not available | $100 * (10%−20%) = −$10 (sell $10 of fund) | $100 * (10%−(−20%)) = +$30 (buy $30 of fund) |
| Value After Rebalance | $110 | $110 | $110 |

To demonstrate the potential impact of rebalancing, the inventors looked for a recent historical period with a significantly large difference between an inverse ETF return and the fund multiple times the target base index for a longer holding period. The inverse −2×ETF based on the Dow Jones U.S. Oil & Gas Index$^{SM}$ has been cited as having large performance differences for longer periods. For this rebalancing case study, the inventors evaluated a Daily Objective Strategy based on this index over the period December 2008 through April 2009, when volatility levels were exceptionally elevated and the index rose just 2.2 percent. For this Daily Strategy, the inventors used index total returns, excluding expenses and trading costs. It does not represent an actual investment or actual ETF returns.

A −2× Daily Strategy based on this target base index without rebalancing would have lost negative 25.8 percent over this period without fees, expenses and transaction costs. This is a difference of 21 percent in return from the negative 4.4 percent for a −2× period return, given the 2.2 percent index return and excluding fund fees, expenses and transaction costs. The inventors analyzed a broad range of percentage-trigger strategies (any positive percentage from 0 to 25 percent) and found that any such strategy could have meaningfully reduced the difference in performance between the target base index and the inverse ETF.

Table 5 compares the performance for the unrebalanced inverse ETF with three such sample percentage-trigger rebalancing strategies. Given the high level of volatility during the case study period, Table 5 focused on the 10 percent trigger (that is, the inverse ETF was rebalanced when the cumulative difference between index return and inverse ETF return was greater than 10 percent) and assumed all rebalancing was done based on end-of-day index levels with no fees, expenses or transaction costs. Using this 10 percent rebalancing trigger, the rebalanced −2× Dow Jones U.S. Oil & Gas Index$^{SM}$ Daily Strategy return would have been negative 6.0 percent, just 1.6 percent below the negative 4.4 percent return that a −2× inverse ETF investor might set as a target for a five-month holding period. There was an average of 3.8 days between rebalances. It is worth noting that in a lower-volatility period, the 10 percent trigger likely would have prompted less frequent rebalancing.

TABLE 5

Impact of Rebalancing with a 10% Trigger on Dow Jones U.S. Oil & Gas Index$^{SM}$ Holding Period: December 2008 to April 2009

| | −2× | | −2× Daily Strategy Return (Average Days Between Trades) | | |
|---|---|---|---|---|---|
| Index Return | Index Return | No Rebal- ancing | Rebalanced: 5% Trigger | Rebalanced: 10% Trigger | Rebalanced: 15% Trigger |
| 2.2% | −4.4% | −25.8% | −2.4% (1.75 days) | −6.0% (3.81 days) | −5.2% (6.06 days) |

Figure 11:
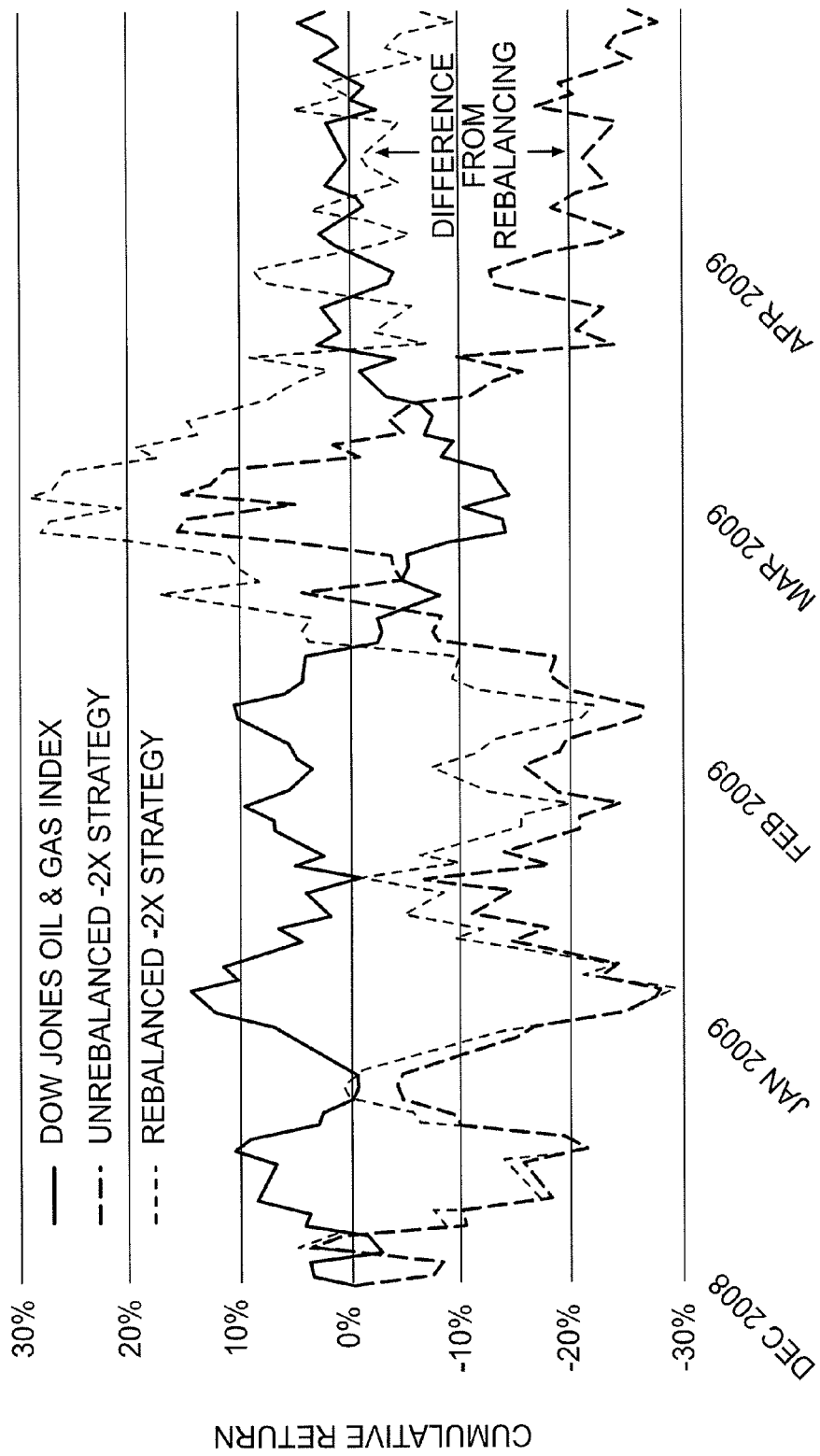
FIG. 11 illustrates the index cumulative return over the period for the Dow Jones U.S. Oil & Gas Index$^{SM}$, an unbalanced −2× daily strategy, and a balanced −2× daily strategy.

FIG. 11 shows the index cumulative return over the period for the Dow Jones U.S. Oil & Gas Index$^{SM}$ (black line), an unbalanced −2× daily strategy (dark gray line), and a balanced −2× daily strategy (light gray line). This case study is one example with a specific rebalancing rule employed on a particular index for a single time frame, but it illustrates how a perceived performance difference may be reduced significantly for investors focused on achieving longer-term returns using leveraged and/or inverse ETFs designed to provide a multiple of index return on a daily basis.

Rebalancing may not have much of an effect on the average difference between a +2× and −2×S&P 500®Daily Objective Strategy and their period index returns multiplied by +2× and −2×, respectively. On the other hand, rebalancing may reduce the difference in those periods in which compounding had a larger positive or negative effect. The average and median differences remained close to zero with and without rebalancing over the 50-year history of market conditions. For the +2× strategy, the average difference between the leveraged Daily Objective Strategy and the index period return times two was 0.4% unrebalanced and 0.1% rebalanced; for the −2× strategy, the average difference of 0.5% unrebalanced was reduced to 0.2% with rebalancing. In certain embodiments, rebalancing affected the more extreme periods—those with the most positive and negative differences between the +2× and −2× Daily Objective Strategies, and the period index returns times the same multiples.

Figure 12:
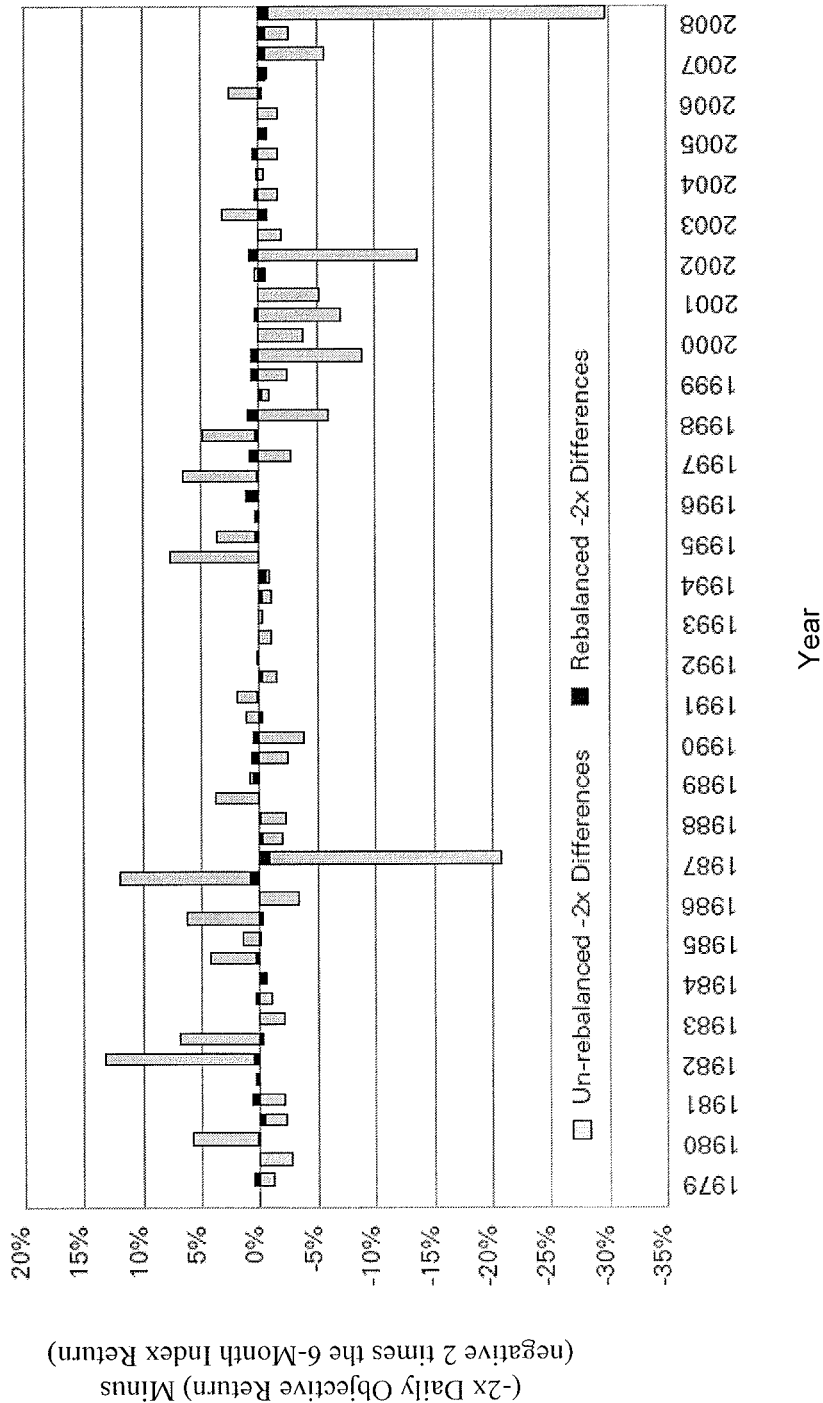
FIG. 12 illustrates the sequence of differences for the last 30 years of a sample between the −2×S&P 500® Daily Objective Strategy return and negative 2 times the 6-month index return, both with and without a 5% trigger rebalancing.

FIG. 12 illustrates the impact of rebalancing for individual holding periods consistent with certain embodiments. FIG. 12 shows the sequence of differences for the last 30 years of a sample between the −2×S&P 500® Daily Objective Strategy return and negative 2 times the 6-month index return, both with and without a 5% trigger rebalancing. It is shown in FIG. 12 that the differences were largest in volatile years: 1982, 1986, 1987, 2002, and 2008. FIG. 12 also shows that rebalancing was effective in reducing the size of these differences, with the biggest impact on those years in which volatility was large in magnitude.

Inventors calculated ratio of the Daily Objective Strategy returns to the underlying index returns over each 6-month period with and without rebalancing. Across these periods, the percentage of realized multiples that fell within a tight range around the stated multiple increased with rebalancing.

Table 6 shows the frequency of these periods within each of three ranges: [negative 0.25, positive 0.25], [negative 0.50, positive 0.50], and [negative 1.0, positive 1.0] around the stated daily multiple of positive 2.00 or negative 2.00.

The potential benefits of rebalancing for investors seeking to get closer to the stated multiple over periods of 6 months are demonstrated. For the rebalanced strategies, more than 90% of the realized multiples fell within the tightest range shown (that is, within positive or negative 0.25 of the stated multiple). For the +2×S&P 500® Daily Objective Strategy, the unrebalanced strategy was within the 1.50 and 2.50 realized multiple range 93.5% of the time, but this frequency increased even further to 99.5% with rebalancing. For the −2×S&P 500® Daily Objective Strategy, the percentage in the range of negative 1.50 to negative 2.50 (within 0.50 of the −2× multiple) increased from 71.5% without rebalancing, to 95.0% with rebalancing. It is worth noting that the frequency of reversals was also reduced for the −2× Daily Objective Strategy (a "reversal" is a period when the multiple was negative when the stated daily multiple was positive, or positive when the stated daily multiple was negative.

TABLE 6

Frequency (%) of Realized Multiples for S&P 500 ® +2× and −2× Daily Objective Strategies (6-Month Periods) Within a Range of the Stated Daily Multiple

| +2× Multiple | | | −2× Multiple | | |
|---|---|---|---|---|---|
| Ranges | Unrebal- anced | Rebal- anced | Ranges | Unrebal- anced | Rebal- anced |
| 1.75 to 2.25 | 86.5% | 95.0% | −1.75 to −2.25 | 43.0% | 92.0% |
| 1.5 to 2.5 | 93.5% | 99.5% | −1.5 to −2.5 | 71.5% | 95.0% |
| 1.0 to 3.0 | 97.0% | 99.5% | −1.0 to −3.0 | 88.0% | 98.0% |
| <0 | 0.5% | 0.5% | >0 | 2.0% | 0.0% |

How often investors would need to rebalance positions depended on whether the stated daily multiple was long or inverse, and on the volatility of the underlying index. For the +2× Daily Objective Strategy held for 6 months, the average number of days between rebalancing triggers was 88.4, or about once a quarter. For the inverse −2× Daily Strategy, rebalancing was triggered more frequently, averaging 12.1 days, or just under two weeks. Even though the trading frequencies were much higher for the −2×S&P 500® Daily Strategy, the size of each rebalancing trade was similar: 5.3% on average for the +2× leveraged strategy, and 6.7% for the −2× inverse strategy.

Figure 13:
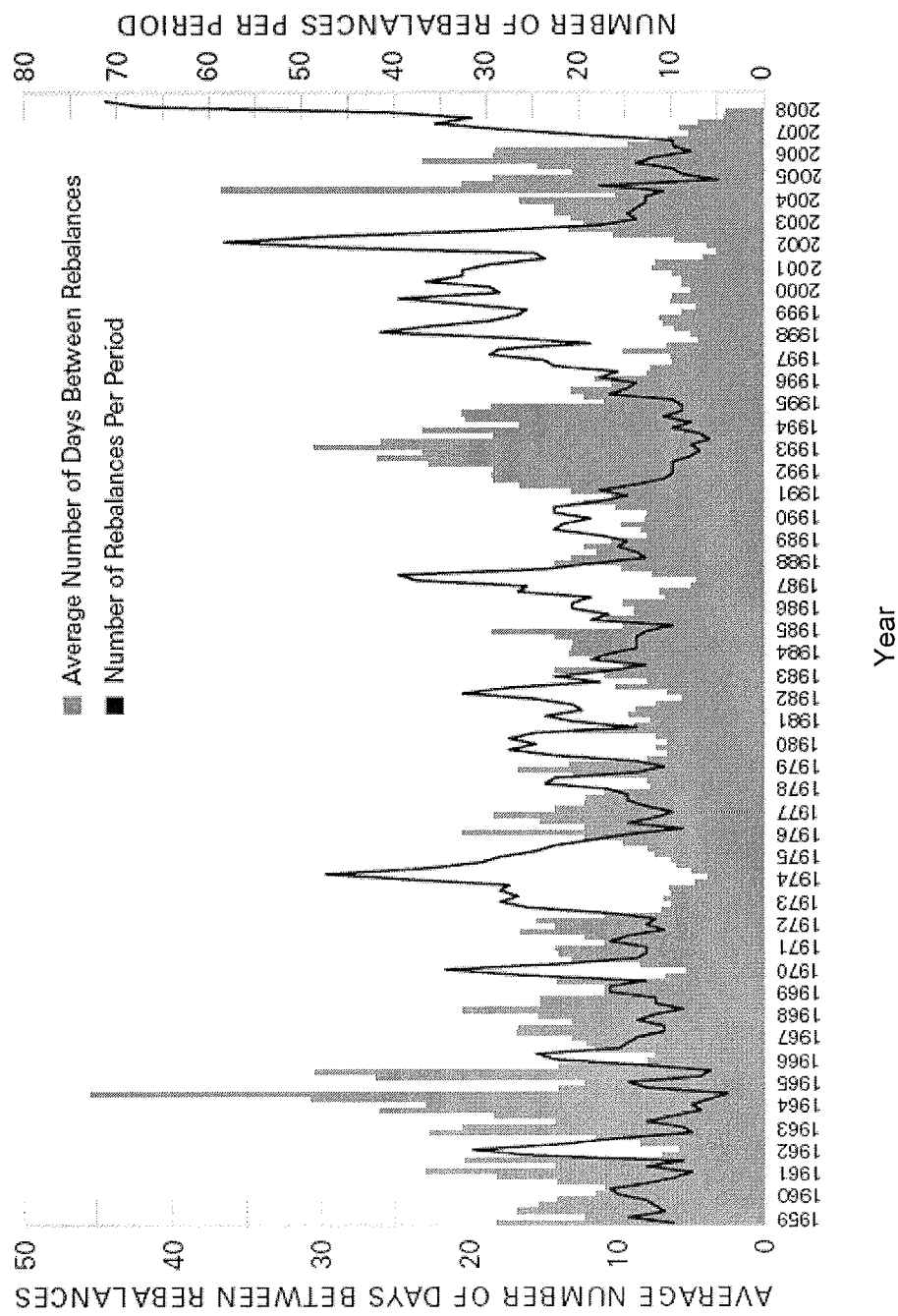
FIG. 13 shows the frequency of rebalancing for a −2×S&P 500® Daily Strategy for each 6-month period in a historical sample.

To describe the adjustments needed for effective rebalancing, FIG. 13 shows the frequency of rebalancing for a −2×S&P 500® Daily Strategy for each 6-month period. The data is displayed in two ways—bars representing the average number of days between rebalancing for each 6-month holding period and a line showing the number of rebalances per period. (Note: Within a given 6-month period studied, the actual number of days between each rebalancing varied depending on the time interval required to meet the 5% trigger.)

The frequency of rebalancing trades tracks index volatility very closely for this −2×S&P 500® Daily Strategy. Across the 50 years of index history, the average number of days between rebalances varied greatly. Between 2003 and mid-2007, a period of relatively low volatility for the S&P 500®, it was common to average 15 to 20 days between rebalances. More recently, a 5% trigger would have led to rebalancing an average of every 3 to 5 days per period. Consistent with record volatility levels experienced in 2008, rebalancing frequencies in the 6-month holding periods for that year were the highest studied in the 50-year history of the S&P 500®.

Rebalancing is effective across a number of indexes, including some with historically lower volatility than the S&P 500®, such as a BARCLAYS® 20+Year U.S. Treasury Index return, and some with higher volatility. The higher-volatility indexes analyzed included the NASDAQ-100 Index®, the Dow Jones U.S. Financials Index$^{SM}$ and the Dow Jones U.S. Oil & Gas Index$^{SM}$. The NASDAQ-100® had a daily return volatility of 28.6% (annualized) from 1985-2008, as compared to the S&P 500®, which measured 18.3% over the same period. The sector indexes also had higher volatility measures than seen for the S&P 500®—the Dow Jones U.S. Financials Index$^{SM}$ at 24.85%, and the Dow Jones U.S. Oil & Gas Index$^{SM}$ at 24.80% over the 1992-2008 period.

Table 7 summarizes the frequency of realized multiples falling into a range of positive 1.50 to positive 2.50 for a +2× Daily Objective Strategy and negative 1.50 to negative 2.50 for a −2× Daily Objective Strategy both with and without rebalancing. The effect of rebalancing was very consistent across indexes, whether they exhibited low, moderate or high return volatility. The percentage of realized multiples after rebalancing in the range of +/−0.50 around the stated daily multiple is above 90% for both +2× and −2× Daily Objective Strategies. This was observed even for the higher-risk sector indexes where the −2× Strategy showed only a 59% and 60% frequency of realized multiples in the −1.50 to −2.50 range without rebalancing.

TABLE 7

Frequency (%) of Realized Multiples Across Indexes for +2x and −2x Daily Objective Strategies (6-Month Periods) Within a +/− 0.50 Range of the Stated Daily Multiple

|  | +2x Daily Objective Strategy* | | −2x Daily Objective Strategy* | |
| --- | --- | --- | --- | --- |
|  | Unrebalanced | Rebalanced | Unrebalanced | Rebalanced |
| BARCLAYS ® 20+ Year U.S. Treasury | 91.7 | 96.7 | 75.0 | 95.0 |
| S&P 500 ® | 93.5 | 99.5 | 71.5 | 95.0 |
| NASDAQ-100 ® | 85.9 | 97.8 | 51.1 | 96.7 |
| Dow Jones U.S. Financials Index$^{SM}$ | 88.2 | 97.1 | 60.3 | 91.2 |
| Dow Jones U.S. Oil & Gas Index | 79.4 | 94.1 | 58.8 | 97.1 |

Note:
*Frequencies are for the range of +1.5 to +2.5 for +2x Daily Objective Strategy and −1.5 to −2.5 for −2x Daily Objective Strategy.

Table 8 shows the average days between rebalances across the periods studied for each index. The amount of rebalancing required was a function of the volatility of the index. The +20 year U.S. Treasury +2x Daily Objective Strategy was rebalanced the least, on average, with 127 days between rebalancing trades, and 17% of the periods not triggering any rebalancing trades at all. For the +2× index strategies, the NASDAQ-100®triggered the most frequent rebalancing, averaging every 35 days across 6-month holding periods.

TABLE 8

Average Days Between Rebalances (5% Trigger) Across 6-Month Periods

|  | +2x Daily Objective Strategy* | −2x Daily Objective Strategy* |
| --- | --- | --- |
| BARCLAYS ® 20+ Year U.S. Treasury | 127.2 | 16.5 |
| S&P 500 ® | 88.4 | 12.1 |
| NASDAQ-100 ® | 34.6 | 5.8 |
| Dow Jones U.S. Financials Index$^{SM}$ | 60.1 | 8.6 |
| Dow Jones U.S. Oil & Gas Index$^{SM}$ | 43.8 | 6.8 |

Note:
Data show average of the mean days between rebalancing trades for each period.

As Table 8 shows, with the S&P 500® −2× Daily Objective Strategy, the average number of days between rebalancing was significantly lower than the +2× version of the strategy. The 20+Year U.S. Treasury Index −2× Daily Objective Strategy had an average of 16 days between rebalances, while the NASDAQ-100®—the most volatile index—had the most frequent rebalancing of once every 6 days, on average.

Figure 14:
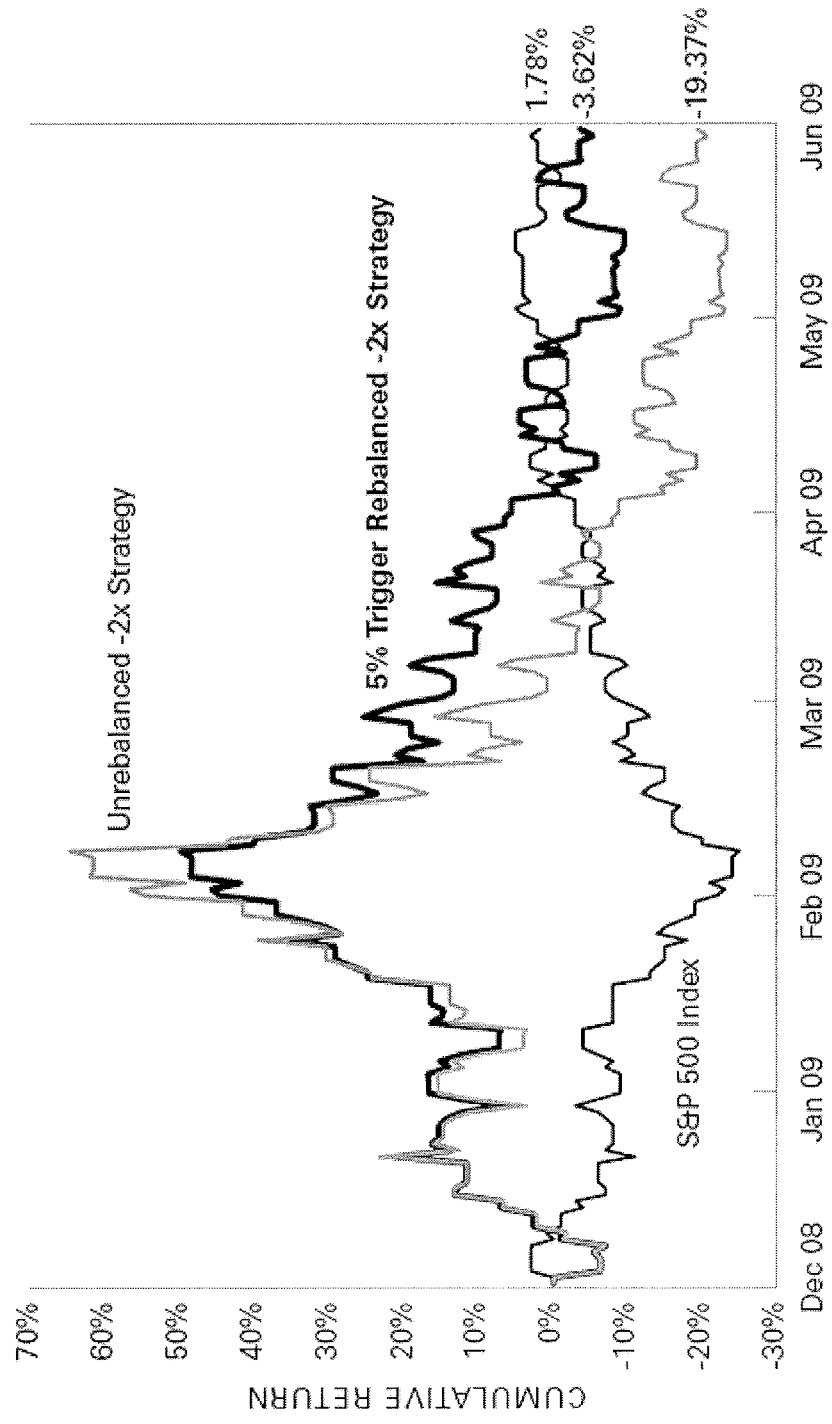
FIG. 14 shows the cumulative return based on closing index values of an unrebalanced −2× Daily Strategy along with a rebalancing strategy using the 5% trigger.

The inventors tracked the cumulative returns of a −2× Daily Objective Strategy based on the S&P 500® index over the first half of 2009, a period when the index had levels of far-above-normal return volatility. FIG. 14 shows the cumulative return based on closing index values of an unrebalanced −2× Daily Strategy along with a rebalancing strategy using the 5% trigger, assuming all rebalancing was done based on closing index levels and ignoring transaction costs. Through early March 2009, the index had fallen more than 20%, but then reversed to end the 6-month period up 1.78%. From year-end 2008 through Jun. 30, 2009, there was a large difference between the negative 19.37% change in the unrebalanced −2× Daily Objective Strategy and negative 3.60% (that is, close to −2 times the 1.78% index return for the period). Using a 5% rebalancing trigger, the 6-month return for the −2× Daily Objective Strategy was negative 3.62% percent, very close to the theoretical negative 3.60% goal and consistent with the results of the historical study detailed earlier. On March 5, about two months into this 6-month period in 2009, the S&P 500® index reached its low. Notably, at this point, the unrebalanced −2×S&P 500® Daily Objective Strategy position showed a large gain relative to the rebalanced position, benefiting from the compounding effect in the downward-trending market. This shows that rebalancing (like compounding) can reduce as well as increase returns depending on the degree of trend and volatility in the marketplace during the holding period. Later in the period after the S&P 500® reversed direction and began to rise and move in a trading range, the unrebalanced strategy began to lag the value of the rebalanced −2× Daily Strategy position, and it was over this period that the rebalancing of the position reduced the gap between −2× times the period index return and that of the −2× Daily Strategy.

Figure 15:
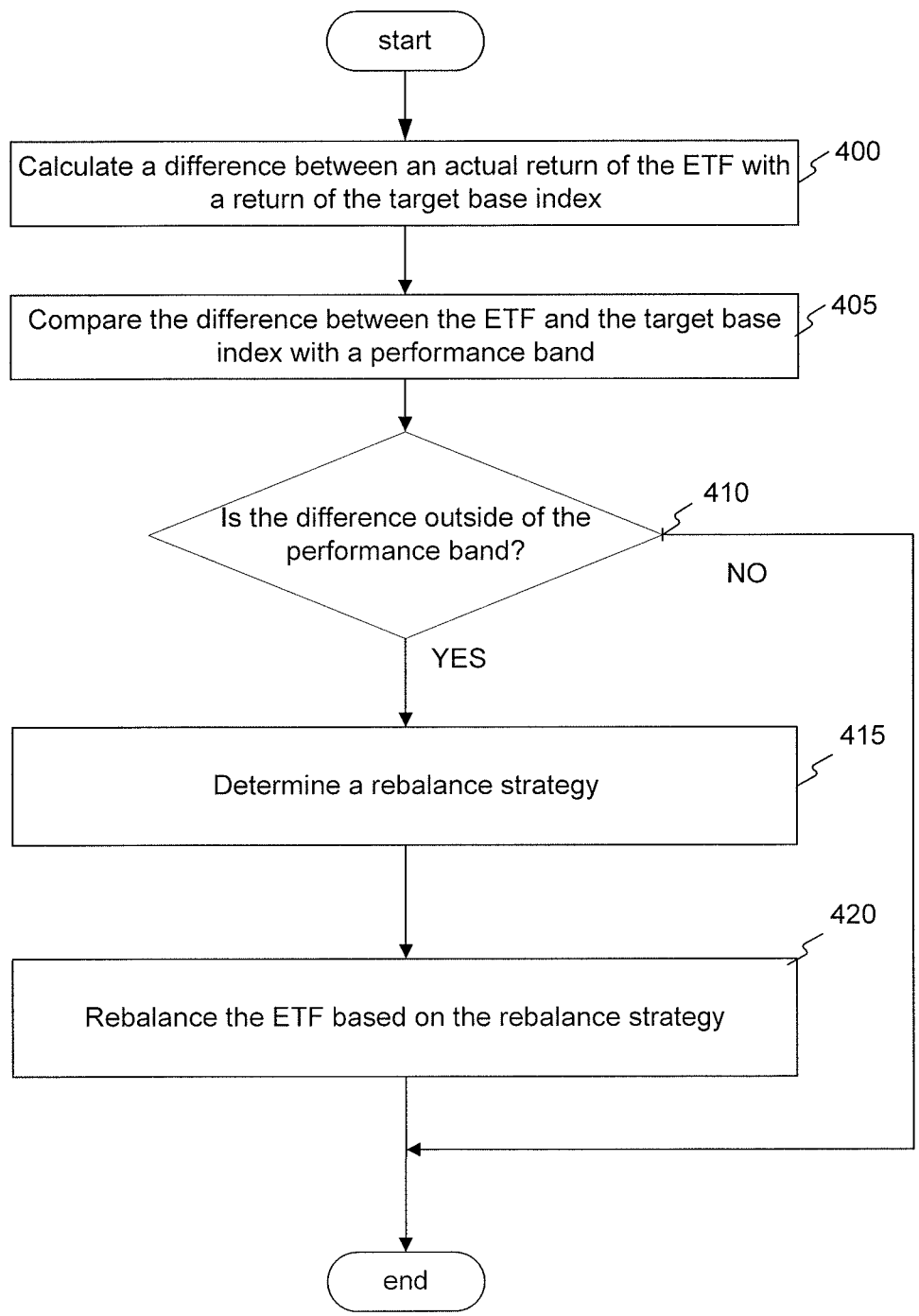
FIG. 15 schematically illustrates an exemplary process for rebalancing a leveraged and/or inverse ETF.

FIG. 15 is a flowchart showing an exemplary process for rebalancing a leveraged and/or inverse ETF. In this embodiment, the trigger event for rebalancing is based on a comparison between the actual return of the leveraged and/or inverse ETF and the return of the target base index. System 100 may calculate a difference between the actual return of the leveraged and/or inverse ETF and the return of the target base index (Step 400). System 100 may then compare the difference with a performance band (Step 405). Next, system 100 may determine whether the difference falls within or outside of the performance band (Step 410). If the difference falls within the performance band (NO, Step 410), no rebalance will be performed for the leveraged and/or inverse ETF. If the difference falls outside of the performance band (YES, Step 410), system 100 may determine a rebalance strategy (Step 415).

The rebalance strategy may include an amount of holdings (for example, 5 percent) of the leveraged and/or inverse ETF to be sold and/or an amount of holdings (for example, 100 shares of a certain stock) to be purchased into the leveraged and/or inverse ETF. For example, if the difference is positive, and is greater than the upper limit of the performance band, system 100 may determine to sell a portion of the existing holdings in the leveraged and/or inverse ETF. If the difference is negative, and is less than the lower limit of the performance band, system 100 may determine to buy additional holdings into the leveraged and/or inverse ETF. System 100 may rebalance the leveraged and/or inverse ETF based on the determined rebalance strategy (Step 420).

Figure 16:
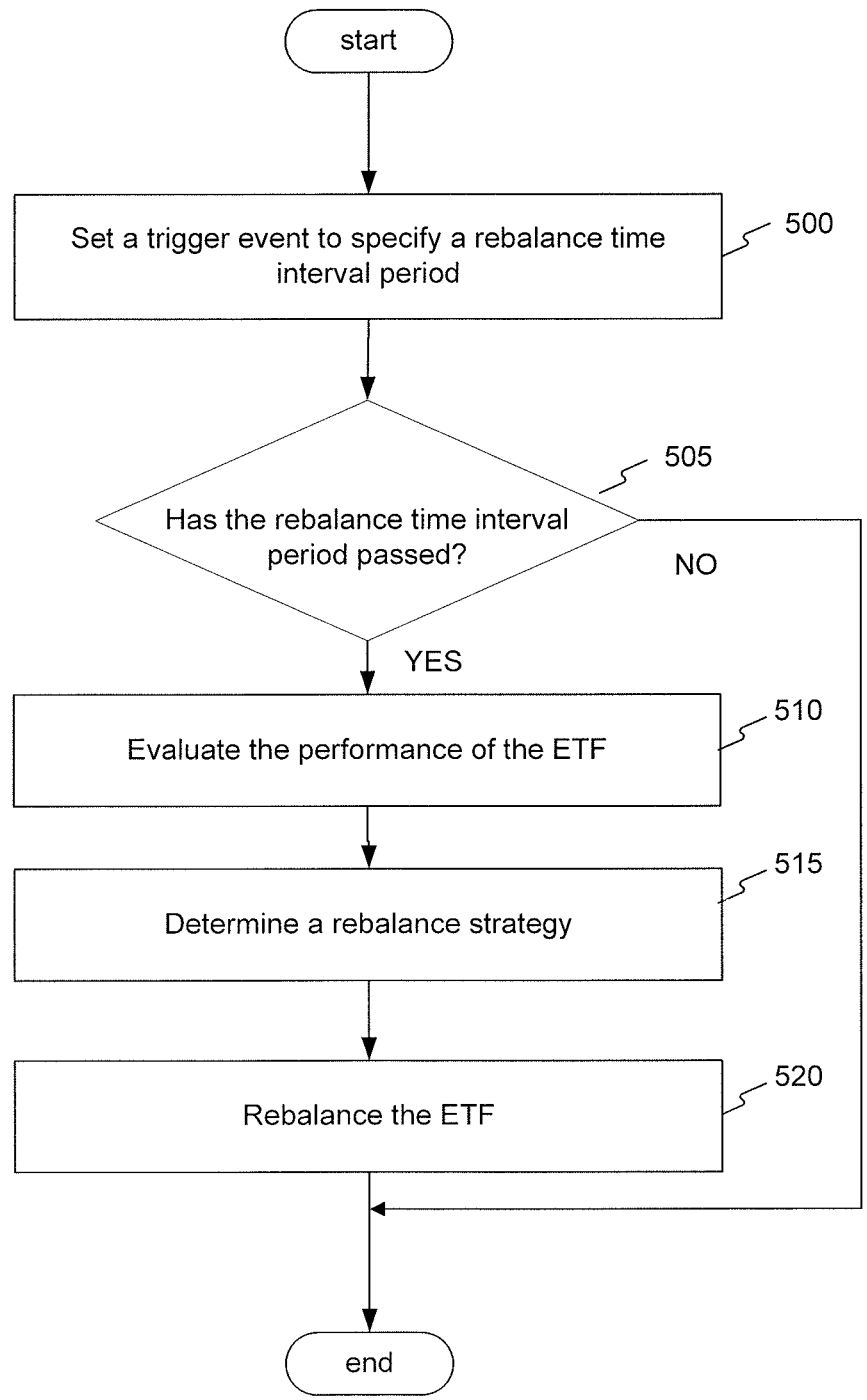
FIG. 16 illustrates an exemplary rebalance process consistent with the disclosed embodiments.

FIG. 16 schematically illustrates another embodiment for rebalancing a leveraged and/or inverse ETF. In this embodiment, the trigger event for rebalancing the leveraged and/or inverse ETF is based on a predetermined rebalance interval period. System 100 may set a trigger event to specify a rebalance interval period (Step 500). Alternatively, the user at user terminal 145a, 145b, or 145c may set the trigger event to specify the rebalance interval period through the user interface 200. System 100 may determine whether the rebalance interval period has passed (Step 505). If the rebalance interval period has not passed (NO, Step 505), system 100 may not perform a rebalance of the leveraged and/or inverse ETF. If the rebalance interval period has passed (YES, Step 505), system 100 may rebalance the leveraged and/or inverse ETF. System 100 may evaluate the performance of the leveraged and/or inverse ETF (Step 510).

For example, system 100 may compare the return of the leveraged and/or inverse ETF with the return of the target base index. System 100 may determine whether the result of the comparison indicates that a rebalance is needed. If a rebalance of the leveraged and/or inverse ETF is needed, system 100 may determine a rebalance strategy (Step 515). The rebalance strategy may be determined based on the comparison between the returns of the leveraged and/or inverse ETF and the target base index. The rebalance strategy may include an amount of existing holdings within the leveraged and/or inverse ETF to be sold and/or an amount of additional holdings to be purchased into the leveraged and/or inverse ETF. System 100 may then rebalance the leveraged and/or inverse ETF based on the rebalance strategy (Step 520).

Figure 17:
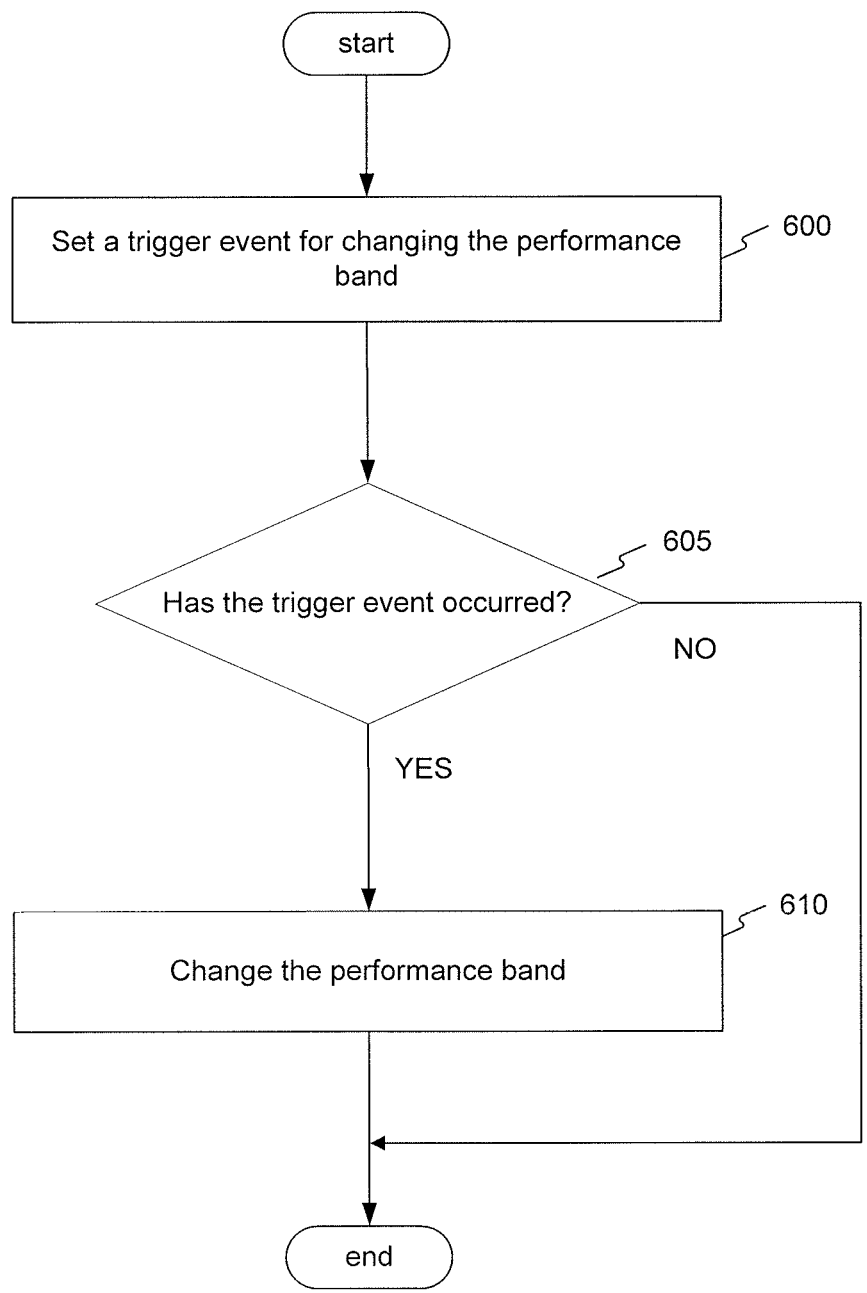
FIG. 17 illustrates an exemplary process for changing a performance band consistent with the disclosed embodiments.

FIG. 17 schematically illustrates an exemplary process for changing the performance band. System 100 may set a trigger event for changing the performance band (Step 600). Alternatively, the user may set the trigger event for changing the performance band at user terminal 145a, 145b, or 145c, through user interface 200. The trigger event for changing the performance band may be based on an evaluation of the performance of the leveraged and/or inverse ETF. For example, the trigger event may be based on a comparison between the performance of the leveraged and/or inverse ETF and the performance of the target base index. When the performance, e.g., the return, of the leveraged and/or inverse ETF is below a predetermined threshold, system 100 and/or the user may determine that the performance band needs to be changed.

System 100 may determine whether the trigger event has occurred (Step 605). If the trigger event has not occurred (NO, Step 605), the performance band may not be changed. If the trigger event has occurred (YES, Step 605), the performance band may be changed. The performance band may be changed by server 105, or by the user at user terminals 145a, 145b, and 145c. Assuming the original performance band is [negative 10%, positive 10%], the band may be enlarged to any desirable range, for example, [negative 15%, positive 15%], [negative 10%, positive 15%], or [negative 15%, positive 10%]. The original performance band may also be narrowed to any desirable range, for example, [negative 5%, positive 5%], [negative 5%, positive 10%], or [negative 10%, positive 5%]. In above examples, the enlarged and/or narrowed performance band may have the same or different magnitudes in the upper and lower limits.

The above disclosed methods for rebalancing the leveraged and/or inverse ETF may be implemented as a computer program product, which may be encoded on a computer-readable medium tangibly embodied in a storage device. The computer program product may be loadable into a memory of a computer. The computer program product may include instructions which, when executed on a processor, perform the above disclosed methods for rebalancing the leveraged and/or inverse ETF.

The disclosed methods and systems may be employed in a financial system or other systems where leveraged and/or inverse exchange-traded funds and/or similar financial products may be available. The disclosed methods and systems for rebalancing the leveraged and/or inverse ETF may improve the performance of the leveraged and/or inverse ETF over time.

It will be apparent to those skilled in the art that various modifications and variations can be made to the disclosed methods and systems for rebalancing the leveraged and/or inverse ETF. It is intended that the specification and examples be considered as exemplary only, with a true scope of the disclosure being indicated by the following claims and their equivalents.

What is claimed is:

1. A computer-implemented method for rebalancing an exchange-traded fund, comprising steps, performed by a programmed processor based computer, of:
    setting, by the programmed processor, a daily target return for the exchange-traded fund based on a target base index;
    monitoring, by the programmed processor, an actual return of the exchange-traded fund over a time period;
    setting, by the programmed processor, a performance band for rebalancing the exchange-traded fund, the performance band being a quantitative range having an upper limit and a lower limit and being set based on the daily target return and a volatility of the target base index measured at least partially over a historical period of time; and
    generating, by the programmed processor, signals to rebalance the exchange- traded fund based on the performance band and the actual return.

2. The computer-implemented method of claim 1, wherein generating signals comprises:
    calculating a difference between the actual return of the exchange-traded fund and a return of the target base index;
    determining a rebalance strategy based on the difference; and
    generating signals to rebalance the exchange-traded fund based on the rebalance strategy.

3. The computer-implemented method of claim 2, wherein the rebalance strategy includes at least one of buying exchange-traded fund holdings, selling exchange-traded fund holdings, or shorting the exchange-traded fund.

4. The computer-implemented method of claim 2, wherein the rebalance strategy includes shorting an inverse exchange-traded fund when the volatility is higher than a threshold volatility.

5. The computer-implemented method of claim 2, wherein the rebalance strategy includes investing in both a leveraged exchange-traded fund and an inverse exchange-traded fund when the volatility is lower than a threshold volatility.

6. The computer-implemented method of claim 2, wherein the rebalance strategy includes shorting both a leveraged exchange-traded fund and an inverse exchange-traded fund when the volatility is higher than a threshold volatility.

7. The computer-implemented method of claim 2, further comprising:
  receiving user input, and;
  customizing at least one of the performance band and the rebalance strategy for performing the rebalancing, based on the user input, wherein customizing comprises changing at least one of the upper limit or the lower limit of the performance band.

8. The computer-implemented method of claim 2, further comprising:
  comparing the difference with the performance band; and
  generating signals to rebalance the exchange-traded fund when the difference falls outside of the performance band.

9. The computer-implemented method of claim 8, wherein the upper limit is different from the lower limit.

10. The computer-implemented method of claim 8, further comprising varying at least one of the upper limit and the lower limit within a predetermined range.

11. The computer-implemented method of claim 1, further comprising:
  setting a trigger event for changing the performance band.

12. The computer-implemented method of claim 1, wherein the performance band is predetermined.

13. The computer-implemented method of claim 1, wherein setting the performance band includes dynamically setting the performance band during a holding period of the exchange-traded fund.

14. The computer-implemented method of claim 1, wherein setting the performance band includes dynamically setting the performance band based on the volatility of the target base index during a holding period of the exchange-traded fund.

15. The computer-implemented method of claim 1, wherein setting the performance band includes dynamically setting the performance band based on an implied volatility of the target base index during a holding period of the exchange-traded fund.

16. The computer-implemented method of claim 1, wherein the exchange-traded fund is one of a leveraged exchange-traded fund or an inverse exchange-traded fund, or the exchange-traded fund is a combination of a leveraged exchange-traded fund and an inverse exchange-traded fund.

17. A computer-readable medium tangibly embodied in a storage device containing instructions which, when executed on a processor, perform a method of rebalancing an exchange-traded fund, the method comprising:
  setting a daily target return for the exchange-traded fund based on a target base index;
  monitoring an actual return of the exchange-traded fund over a time period;
  setting a performance band for rebalancing the exchange-traded fund, the performance band being a quantitative range having an upper limit and a lower limit and being set based on the daily target return and a volatility of the target base index measured at least partially over a historical period of time; and
  generating signals to rebalance the exchange-traded fund based on the performance band and the actual return.

18. The computer-readable medium of claim 17, wherein generating signals comprises:
  calculating a difference between the actual return of the exchange-traded fund and a return of the target base index;
  determining a rebalance strategy based on the difference; and
  generating signals to rebalance the exchange-traded fund based on the rebalance strategy.

19. The computer-readable medium of claim 18, wherein the rebalance strategy includes at least one of buying exchange-traded fund holdings, selling exchange-traded fund holdings, or shorting the exchange-traded fund.

20. The computer-readable medium of claim 18, wherein the rebalance strategy includes shorting an inverse exchange-traded fund when the volatility is higher than a threshold volatility.

21. The computer-readable medium of claim 18, wherein the rebalance strategy includes investing in both a leveraged exchange-traded fund and an inverse exchange-traded fund when the volatility is lower than a threshold volatility.

22. The computer-readable medium of claim 18, wherein the rebalance strategy includes shorting both a leveraged exchange-traded fund and an inverse exchange-traded fund when the volatility is higher than a threshold volatility.

23. The computer-readable medium of claim 18, wherein the method further comprises:
  receiving user input at a user interface to customize at least one of the performance band and the rebalance strategy for performing the rebalancing.

24. The computer-readable medium of claim 18, wherein the method further comprises:
  comparing the difference with the performance band; and
  generating signals to rebalance the exchange-traded fund when the difference falls outside of the performance band.

25. The computer-readable medium of claim 24, wherein the upper limit is different from the lower limit.

26. The computer-readable medium of claim 24, wherein the method further comprises varying at least one of the upper limit and the lower limit within a predetermined range.

27. The computer-readable medium of claim 17, wherein the method further comprises setting a trigger event for changing the performance band.

28. The computer-readable medium of claim 17, wherein the performance band is predetermined.

29. The computer-readable medium of claim 17, wherein setting the performance band includes dynamically setting the performance band during a holding period of the exchange-traded fund.

30. The computer-readable medium of claim 17, wherein setting the performance band includes dynamically setting the performance band based on the volatility of the target base index during a holding period of the exchange-traded fund.

31. The computer-readable medium of claim 17, wherein setting the performance band includes dynamically setting the performance band based on an implied volatility of the target base index during a holding period of the exchange-traded fund.

32. The computer-readable medium of claim 17, wherein the exchange-traded fund is one of a leveraged exchange-traded fund or an inverse exchange-traded fund, or the exchange-traded fund is a combination of a leveraged exchange-traded fund and an inverse exchange-traded fund.

33. A system for rebalancing an exchange-traded fund, the system comprising:
a server configured to:
set a daily target return for the exchange-traded fund based on a target base index; and
generate signals to perform a rebalance on the exchange-traded fund based on a performance band and an actual return of the exchange-traded fund, the performance band being a quantitative range having an upper limit and a lower limit and being set based on the daily target return and a volatility of the target base index measured at least partially over a historical period of time; and
a user interface configured to:
receive an input from a user;
display to the user the actual return of the exchange-traded fund over a time period; and
customize the performance band for performing the rebalance, based on the input from the user, wherein customizing the performance band comprises changing at least one of the upper limit or the lower limit of the performance band.

34. The system of claim 33, wherein:
the server is further configured to:
calculate a difference between the actual return of the exchange-trade fund and a return of the target base index;
determine a rebalance strategy based on the difference; and
generate signals to rebalance the exchange-traded fund based on the rebalance strategy.

35. The system of claim 34, wherein the rebalance strategy includes at least one of buying exchange-traded fund holdings, selling exchange-traded fund holdings, or shorting the exchange-traded fund.

36. The system of claim 34, wherein the rebalance strategy includes shorting an inverse exchange-traded fund when the volatility is higher than a threshold volatility.

37. The system of claim 34, wherein the rebalance strategy includes investing in both a leveraged exchange-traded fund and an inverse exchange-traded fund when the volatility is lower than a threshold volatility.

38. The system of claim 34, wherein the rebalance strategy includes shorting both a leveraged exchange-traded fund and an inverse exchange-traded fund when the volatility is higher than a threshold volatility.

39. The system of claim 34, wherein the user interface is configured to:
receive user input to customize the rebalance strategy.

40. The system of claim 34, wherein the user interface is configured to:
receive user input to customize a trigger event for changing the performance band.

41. The system of claim 34, wherein the server is further configured to:
compare the difference with the performance band; and
generate signals to rebalance the exchange-traded fund when the difference falls outside of the performance band.

42. The system of claim 34, wherein the user interface is configured to:
receive user input to customize the performance band by setting the upper limit to be different from the lower limit.

43. The system of claim 34, wherein the server is configured to:
set the performance band to have different upper and lower limits.

44. The system of claim 34, wherein the user interface is configured to:
receive user input to customize the performance band by varying at least one of the upper limit and the lower limit within a predetermined range.

45. The system of claim 34, wherein the server is configured to:
vary at least one of the upper limit and the lower limit within a predetermined range.

46. The system of claim 33, wherein the performance band is predetermined.

47. The system of claim 33, wherein the server is configured to:
dynamically set the performance band during a holding period of the exchange-traded fund.

48. The system of claim 33, wherein the user interface is configured to:
receive user input to customize the performance band by dynamically setting the performance band during a holding period of the exchange-traded fund.

49. The system of claim 33, wherein the server is configured to:
dynamically set the performance band based on the volatility of the target base index during a holding period of the exchange-traded fund.

50. The system of claim 33, wherein the user interface is configured to:
receive user input to customize the performance band by dynamically setting the performance band based on the volatility of the target base index during a holding period of the exchange-traded fund.

51. The system of claim 33, wherein the server is configured to:
dynamically set the performance band based on an implied volatility of the target base index during a holding period of the exchange-traded fund.

52. The system of claim 33, wherein the user interface is configured to:
receive user input to customize the performance band by dynamically setting the performance band based on an implied volatility of the target base index during a holding period of the exchange-traded fund.

53. The system of claim 33, wherein the exchange-traded fund is one of a leveraged exchange-traded fund or an inverse exchange-traded fund, or the exchange-traded fund is a combination of a leveraged exchange-traded fund and an inverse exchange-traded fund.

* * * * *